United States Patent
Rosenhouse et al.

(10) Patent No.: US 8,971,424 B2
(45) Date of Patent: Mar. 3, 2015

(54) COMBINING PILOT-SYMBOL-BASED PHASE ESTIMATION WITH DATA-SYMBOL-BASED PHASE ESTIMATION

(75) Inventors: Isaac Rosenhouse, Kiryat-Ono (IL); Alon Harel, Tel-Aviv (IL)

(73) Assignee: Ceragon Networks Ltd., Tel-Aviv (IL)

( * ) Notice: Subject to any disclaimer, the term of this patent is extended or adjusted under 35 U.S.C. 154(b) by 427 days.

(21) Appl. No.: 13/118,625

(22) Filed: May 31, 2011

(65) Prior Publication Data

US 2011/0293042 A1 Dec. 1, 2011

Related U.S. Application Data

(60) Provisional application No. 61/349,914, filed on May 31, 2010.

(51) Int. Cl.
*H04K 1/10* (2006.01)
*H04L 25/02* (2006.01)
*H04L 27/00* (2006.01)

(52) U.S. Cl.
CPC ........ *H04L 25/0232* (2013.01); *H04L 25/0236* (2013.01); *H04L 27/0014* (2013.01)
USPC ........... 375/260; 375/326; 375/329; 375/355; 375/354; 348/725; 348/726

(58) Field of Classification Search
USPC .......................................... 375/316, 362, 329
See application file for complete search history.

(56) References Cited

U.S. PATENT DOCUMENTS

| | | | |
|---|---|---|---|
| 5,049,830 A * | 9/1991 | Yoshida | 329/306 |
| 5,894,334 A * | 4/1999 | Strolle et al. | 348/725 |
| 7,801,249 B2 * | 9/2010 | Zhidkov et al. | 375/326 |
| 2001/0017902 A1 * | 8/2001 | Yamagata et al. | 375/329 |
| 2005/0111603 A1 * | 5/2005 | Ginesi et al. | 375/362 |
| 2009/0122203 A1 * | 5/2009 | Spalink et al. | 348/726 |
| 2014/0010532 A1 * | 1/2014 | Zhang et al. | 398/25 |

OTHER PUBLICATIONS

Donoho "De-Noising by Soft-Thresholding", IEEE Transactions on Information Theory, 41(3): 613-627, May 1995.

* cited by examiner

*Primary Examiner* — Eva Puente

(57) ABSTRACT

A method for a receiver to estimate phase of a carrier wave, including receiving a carrier wave carrying pilot symbols and data symbols extending between the pilot symbols, determining phase of the carrier wave at received pilot symbols, and interpolating the phase of the carrier wave at points between pilot symbols based, at least in part, on an estimated phase of demodulated data symbols. Apparatus for estimate phase of a carrier wave, including a unit for determining phase of the carrier wave at received pilot symbols, and a unit for interpolating the phase of the carrier wave at points between pilot symbols based, at least in part, on an estimated phase of demodulated data symbols. Related apparatus and methods are also described.

16 Claims, 14 Drawing Sheets

COMBINING PILOT-SYMBOL-BASED PHASE ESTIMATION WITH DATA-SYMBOL-BASED PHASE ESTIMATION

RELATED APPLICATION

This application claims the benefit of priority under 35 USC 119(e) of U.S. Provisional Patent Application No. 61/349,914 filed May 31, 2010, the contents of which are incorporated herein by reference in their entirety.

FIELD AND BACKGROUND OF THE INVENTION

The present invention, in some embodiments thereof, relates to a method for a receiver in a communication system to estimate phase of a carrier wave and, more particularly, but not exclusively, to estimate phase of a carrier wave in a QAM modulation receiver, and more particularly, but not exclusively, to estimate phase of a carrier wave in a PSK modulation receiver.

Estimation of carrier phase in receivers for QAM modulations has been traditionally done using a decision-directed PLL. The carrier phase recovery is based on decisions regarding the transmitted symbols. When no decision errors are made this method provides excellent performance. However, decision errors occasionally drive the PLL from its stable operating point in a process known as cycle-slip. A remedy was proposed recently by methods using pilot symbols, which are known at the receivers, to estimate carrier phase recovery. No decision errors are made at the pilot symbols.

Published US patent application 2005/0111603 of Ginesi et al proposes a process for providing a phase synchronization of a pilot aided carrier of an input digital signal z(k), the signal z(k) having signal fields of $L_S$ symbol signals, namely a block of $L_P$ pilot symbol signals $Z^P_{(k)}$ and a data field of $(L_S-L_P)$ data symbol signals $Z^d_{(k)}$, and characterized for each signal field (l) by:

extracting the pilot symbol signals $Z^P_{(k)}$ and calculating an unwrapped phase estimate $\hat{\theta}(1L_S)$ over the pilot block of said signal field (l) and:

interpolating said unwrapped phase estimates of successive signal fields (l, l+1 . . . ) with a Wiener interpolator having M taps to obtain interpolated phase estimates having a Minimum Mean Square Error;

providing linear interpolation between said interpolated phase estimates to obtain phase correction estimates ($\hat{\theta}(k_S)$) over the data field of said signal fields;

calculating from said phase correction estimates ($\hat{\theta}(k_S)$) a phase correction ($e^{-j\hat{\theta}(kS)}$) to be applied to said signal Z(k).

Additional background art includes:

David L. Donoho, "Denoising by Soft Thresholding", IEEE Transactions on Information Theory, vol. 41, no. 3, May 1995, pp. 613-627.

SUMMARY OF THE INVENTION

The present invention, in some embodiments thereof, relates to a method for estimating phase of a carrier wave, which combines benefits of phase estimation using pilot symbols and phase estimation using decision-directed estimation, without degrading stability or accuracy of the estimation process An embodiment of the invention improves carrier phase estimation accuracy over a linear interpolation between pilot symbols by providing a better-than-linear interpolation between the pilot symbols.

An embodiment of the invention combines a decision-directed estimation with a pilot-symbol-based estimation producing improved phase estimation. The combined phase estimation uses data symbols to assist estimation in between the pilot symbols. Combined phase estimation is more robust to errors in decision because the pilot symbols limit how much the decision-directed phase error may grow. The combined phase estimation improves on the pilot-symbol-based estimation because the decision-directed phase estimation provides an improvement to the pilot symbol based estimation.

According to an aspect of some embodiments of the present invention there is provided a method for a receiver to estimate phase of a carrier wave, including receiving a carrier wave carrying pilot symbols and data symbols extending between the pilot symbols, determining phase of the carrier wave at received pilot symbols, and interpolating the phase of the carrier wave at points between pilot symbols based, at least in part, on an estimated phase of demodulated data symbols.

According to some embodiments of the invention, the interpolating includes computing a phase trajectory function to approximately fit the phase trajectory function to the determined phase at the received pilot symbols and to approximately fit the estimated phases at the decoded data symbols.

According to some embodiments of the invention, the phase trajectory function is a linear function, and the phase trajectory function does not pass through a phase of at least one of the pilot symbols.

According to some embodiments of the invention, the interpolating is performed based, at least in part, on an estimated phase of some of the demodulated data symbols between pilot symbols, wherein others of the demodulated data symbols are discarded and do not participate in the interpolation.

According to some embodiments of the invention, the interpolating is performed in an iterative fashion, repeating estimating phase of the carrier wave at demodulated data symbols between pilot symbols, and estimating a phase trajectory of the carrier wave based on the estimated phase of the demodulated data symbols and on the determined phase of the carrier wave at the received pilot symbols, until a stopping criterion is reached.

According to some embodiments of the invention, the interpolating includes computing a phase trajectory function to substantially exactly fit the phase trajectory function to the determined phase at the received pilot symbols and to approximately fit the estimated phases at the decoded data symbols.

According to some embodiments of the invention, the computing further includes computing more than one phase trajectory function, and computing a linear combination of at least some of the more than one phase trajectory functions.

According to some embodiments of the invention, at least some of the phase trajectory functions include trigonometric functions.

According to some embodiments of the invention, the linear combination of trigonometric functions includes a sum of Fourier coefficients multiplying the trigonometric functions.

According to some embodiments of the invention, further including estimating spectral density of phase noise, and selecting the Fourier coefficients corresponding to spectral frequencies found to be dominant in the spectral distribution of the phase noise.

According to some embodiments of the invention, further including selecting one of the phase trajectory functions based, at least in part, on an optimization criterion.

According to some embodiments of the invention, the selecting is made according to a combination of more than one optimization criteria.

According to some embodiments of the invention, the interpolating is based, at least in part, on demodulated data symbols in a data symbol window including data symbols between two adjacent pilot symbols.

According to some embodiments of the invention, the interpolating is based, at least in part, on demodulated data symbols in a data symbol window including data symbols between more than two adjacent pilot symbols.

According to some embodiments of the invention, the phase trajectory function includes a second degree polynomial.

According to some embodiments of the invention, the phase trajectory function includes a polynomial with degrees higher than second degree.

According to some embodiments of the invention, the phase trajectory function includes a trigonometric function.

According to some embodiments of the invention, the receiver is a receiver for QAM modulations.

According to an aspect of some embodiments of the present invention there is provided a receiver using the above methods.

According to an aspect of some embodiments of the present invention there is provided a communication system using the above methods.

According to an aspect of some embodiments of the present invention there is provided a computer-readable storage medium containing a set of instructions for a general purpose computer to implement the above methods.

According to an aspect of some embodiments of the present invention there is provided apparatus for estimate phase of a carrier wave, including a unit for determining phase of the carrier wave at received pilot symbols, and a unit for interpolating the phase of the carrier wave at points between pilot symbols based, at least in part, on an estimated phase of demodulated data symbols.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1:
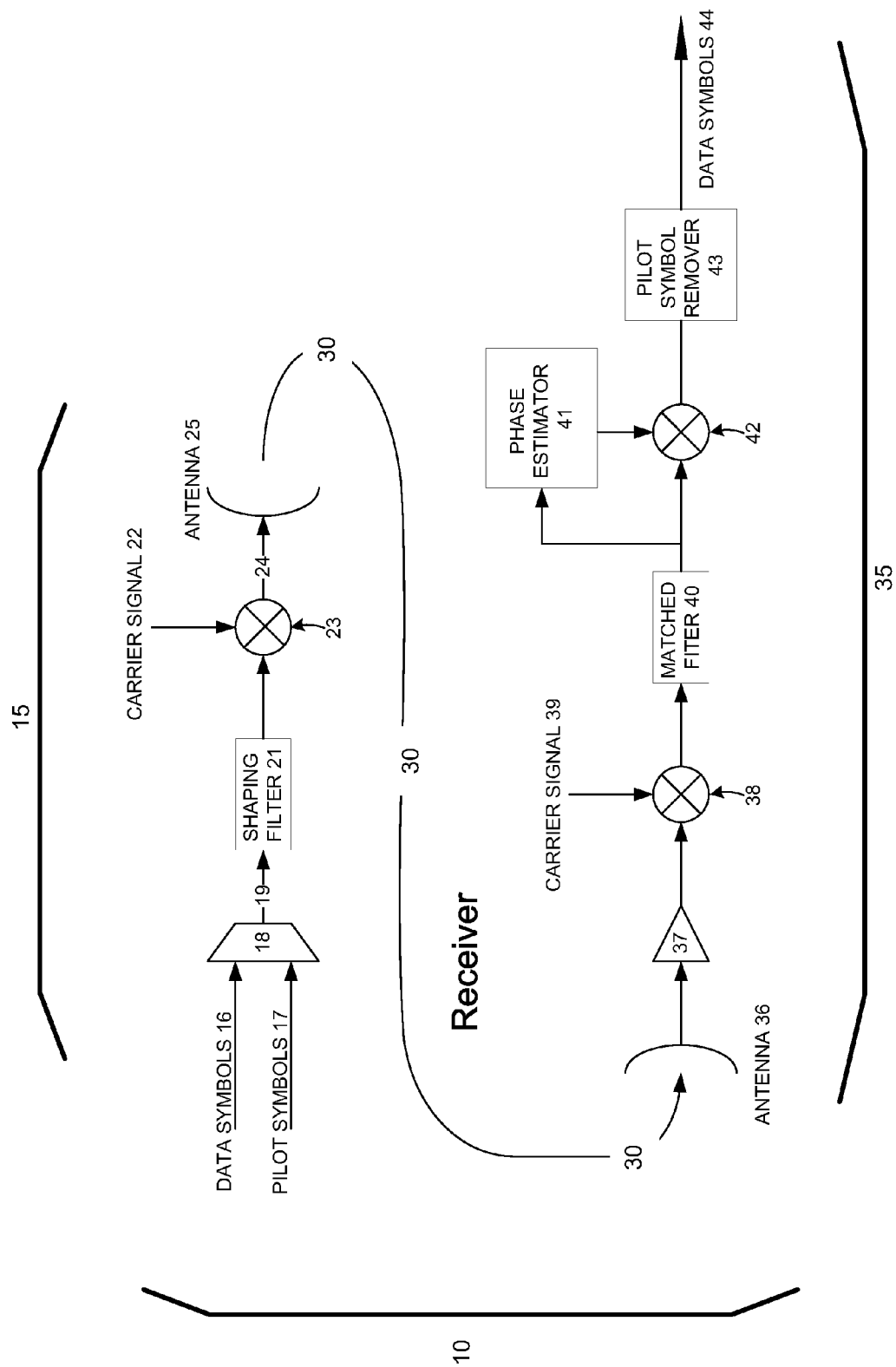
FIG. 1 is a simplified drawing of an example QAM communication system.

The present invention, in some embodiments thereof, relates to a method for a receiver to estimate phase of a carrier wave and, more particularly, but not exclusively, to a QAM modulation receiver.

The present invention, in some embodiments thereof, teaches a method which combines benefits of pilot symbols and of decision-directed estimation of carrier phase, without sacrificing the stability of the estimation process The present invention, in some embodiments thereof, teaches increasing carrier phase estimation accuracy over a prior art linear interpolation between pilot-symbols, by optionally providing an interpolation between the pilot symbols fitted to a data-symbol-based estimation between the pilot symbols.

The present invention, in some embodiments thereof, teaches combined phase estimation, which is more robust to errors in decision because the pilot symbols limit how the decision-directed phase error may grow. The combined phase estimation improves on the pilot-symbol-based estimation because the decision-directed phase estimation provides an improvement to the pilot symbol based estimation.

In some embodiments of the invention the interpolation produces a phase trajectory using, by way of a non-limiting example, one of the following functions: a polynomial function such as a second-degree (parabolic) function; a function with orders higher than second-degree; a trigonometric function, such as a sine function scaled by a coefficient such as a DST coefficient or a cosine function scaled by a coefficient; a linear combination of two or more trigonometric functions scaled by two or more DST coefficients; and other curve fitting functions.

In some embodiments of the invention the coefficients are calculated as standard Fourier series coefficients. In such a case the Fourier series may be a combination of sine and cosine functions.

In some embodiments of the invention the coefficients are calculated using the discrete-sine-transform, which is related to the Fourier transform. In such a case the series includes only sine functions, and not cosine functions.

In some embodiments of the invention a Discrete-Wavelet-Transform (DWT) is performed, a transform which is optionally used for cleaning noise from signals (denoising). One method of denoising is taught by David L. Donoho, "Denoising by Soft Thresholding", IEEE Transactions on Information Theory, vol. 41, no. 3, May 1995, pp. 613-627.

Other denoising methods are known in the art. One aspect of embodiments of the present invention includes removing noise from phase which is obtained by a decision-directed method.

In some embodiments of the invention the interpolation is performed based on phase estimation of data symbols in a specific data symbol window.

One example method for estimating a phase at a data symbol, and more particularly the sine of the phase, is explained below.

Denoting received symbol coordinates by I and Q, and decision coordinates by $\hat{I}$ and $\hat{Q}$, and assuming that the received symbol is rotated by a phase angle denoted by $\theta$, the following holds:

$$I+jQ=(\hat{I}+j\hat{Q})\cdot e^{j\theta}=(\hat{I}\cdot\cos(\theta)-\hat{Q}\cdot\sin(\theta))+j\cdot(\hat{I}\cdot\sin(\theta)+\hat{Q}\cdot\cos(\theta))) \quad \text{Equation 0.1}$$

Therefore:

$$I=\hat{I}\cdot\cos(\theta)-\hat{Q}\cdot\sin(\theta);$$

$$Q=\hat{I}\cdot\sin(\theta)+\hat{Q}\cdot\cos(\theta)$$

The following expression is evaluated:

$$\hat{I}Q-\hat{Q}I=\hat{I}(\hat{I}\cdot\sin(\theta)+\hat{Q}\cdot\cos(\theta))-\hat{Q}\cdot(\hat{I}\cdot\cos(\theta)-\hat{Q}\cdot\sin(\theta))=(\hat{I}^2+\hat{Q}^2)\cdot\sin(\theta) \quad \text{Equation 0.2}$$

Dividing the last result of Equation 0.2 by the power of the decision coordinates—$(\hat{I}^2+\hat{I}^2)$—provides a sine of the phase error.

Another example phase estimation alternative uses a method known as the COordinate Rotation DIgital Computer (CORDIC) algorithm. The phase of a demodulated symbol and the phase of a corresponding decision symbol are evaluated with the CORDIC algorithm. The phases are subtracted, and the outcome is the phase rotation of the symbol.

In some embodiments of the invention the interpolation is done by optionally fitting a smooth curve to phases detected for the data symbols.

Once phases have been estimated, the phases are optionally connected by a smooth curve. Smooth curve fitting is optionally based on assuming a smooth curve model—by way of a non-limiting example, the model may be a sum of sinusoids or a sum of polynomials. Coefficients are optionally selected to make the model fit the data as best as possible. Since the model is optionally smooth, the example of polynomials is a smooth model, a smooth curve connecting the estimated phases is generated.

In some embodiments of the invention the interpolation is performed on a set of symbols between two pilot symbols after the entire set and the pilot symbols have been received.

In some embodiments of the invention the data symbol window includes the data symbols between two adjacent pilot symbols.

In some embodiments of the invention the interpolation is performed on a set of symbols between two pilot symbols before the entire set and the second pilot symbol have been received. An advantage provided by the above method is reduced latency, since there is no need to wait for a following pilot symbol before starting to process the data.

One method of such interpolation optionally estimates the second pilot symbol based, at least in part, on several previous pilot symbols, then performs curve fitting based on data symbols.

The phase of a previous pilot symbol is used for estimating a decision for data symbols. Once a decision about a data symbol is made, the phase rotation of the received data symbol is estimated. The decision value of the phase is known, and the received value of the phase is known—so the phase rotation is calculated. A technique called a Kalman filter, which is well known in the field of signal processing, is used to estimate the rotation of the received symbol based on phase rotations of previous symbols and on a current symbol. The Kalman filter is used for smoothing the phase trajectory.

When a following pilot symbol is received, decisions start being made based on the known phase rotation of the following pilot symbol.

In some embodiments of the invention a slight variation on the above method is made: the decision is based on a most recent estimated phase, either the phase of a pilot symbol, or the phase of a smoothed data symbol.

The above method is not based on trigonometric functions or on FFT and/or DST. The above method is based on methods from a field called statistical signal processing.

In some embodiments of the invention the data symbol window includes a number of data symbols equal to the number between two adjacent pilot symbols, yet the window starts not as a first data symbol after a pilot symbol, and ends not as a last symbol before a pilot symbol.

In some embodiments of the invention the data symbol window is a moving data symbol window, which includes a number of data symbols equal to the number between two adjacent pilot symbols, and upon receipt of a data symbol, the newest data symbol is added to the data symbol window, and the oldest data symbol is dropped from the data symbol window. Given a window of N data symbols and at least one pilot symbol, curve-fitting is performed on the data symbols, and the curve is optionally made to pass through the pilot symbol.

In some embodiments of the invention implementation of the above method, which typically includes a single pilot symbol within a window, is similar to the method described above where a single pilot symbol is known, at a beginning of the window. The Kalman filter is implemented from the location of the pilot symbol, somewhere in the middle of the window, in both directions: forward and backward.

Reference is now made to FIG. 1, which is a simplified drawing of an example QAM communication system 10. The example QAM communication system 10 is presented here to describe how an example application of the present invention may improve carrier wave phase estimation.

The system 10 includes a transmitter 15 and a receiver 35. The transmitter 15 accepts input of data symbols 16 and pilot symbols 17, and multiplexes the inputs optionally using a multiplexer 18, producing a stream 19 containing both data symbols and pilot symbols. The stream 19 optionally passes through a shaping filter 21, the output of which is modulated onto a carrier signal 22 by an up-converter 23. The up-converter 23 outputs a signal 24 to an antenna 25, which transmits a wireless signal 30 to the receiver 35.

FIG. 1 depicts the wireless signal 30 as folded from the transmitter 15 to the receiver 35. This depiction is just so the transmitter 15 and the receiver 35 both fit onto the same page, and does not carry significance with reference to the system 10 and/or the present invention.

It is noted that the carrier signal 22 may introduce phase noise into the up-converter 23, producing phase noise in the output signal of the up-converter 23. The receiver 35 includes an antenna 36, which receives the wireless signal 30.

The antenna 36 optionally sends the received signal through an amplifier 37, to a down-converter 38. The down-converter 38 accepts input from the amplifier 37 and from a local signal generator (not shown), which provides a carrier signal 39 at the carrier frequency to the down-converter 38. The down-converter 38 optionally sends its output to a matched filter 40. The output of the matched filter 40 is optionally sent to a phase estimator 41, and to a phase rotator 42. The phase estimator 41 also provides input to the phase rotator 42. The phase rotator 42 produces output of a stream of demodulated signals to a pilot symbol remover 43, producing a stream of data symbols 44. The data symbols 44 are estimated data symbols, and are dependent, amongst other factors, on the quality of the receiver 35 and of the phase estimation taking place in the phase estimator 41.

It is noted that the carrier signal 39 of the receiver may not be in exactly the same phase as the received wireless signal 30, introducing phase noise to the output of the down-converter 38.

It is noted that the phase estimator 41 estimates the phase of its input signal, that is, the phase estimator 41 tracks the phase trajectory of its input signal, so as to optionally provide an input signal to the phase rotator 42 which produces as little error as possible in demodulating the received symbols.

It is noted that QAM communication systems operate over wire connections too, such as cable systems, and that FIG. 1 is presented as an example of a QAM communication system, without limiting the details of implementation of such a system.

The example system 10 of FIG. 1 is a QAM modulated communication system. In the example system 10, input data symbols 16 are multiplexed with pilot symbols 17. The pilot symbols 17 are symbols known at both ends of the communication link, that is, at the transmitter 15 and at the receiver 35. The data symbols 16 are to be estimated at the receiver end. QAM symbols are denoted as:

$$x_n = I_n + j \cdot Q_n \qquad \text{Equation 1.1}$$

In Equation 1.1 $I_n$ and $Q_n$ denote real and imaginary parts of a QAM symbol $x_n$. n denotes a time index.

After multiplexing, the symbols are filtered by the shaping filter 21, which is typically a square-root raised cosine filter. The filtered signal is up-converted in the transmitter 15, and down-converted in the receiver 35. Both the up-converter and the down-converter use local oscillators which include phase noise.

The down-converted signal is filtered with the matched filter 40. The output signal from the matched filter 40 is approximately given by:

$$z_n = x_n \cdot e^{j\theta_n} + v_n \qquad \text{Equation 1.2}$$

where $v_n$ represents additive noise and $\theta_n$ represents a phase rotation. Typically a phase trajectory behaves as a random walk, that is:

$$\theta_n = \theta_{n-1} + \alpha \cdot w_n \qquad \text{Equation 1.3}$$

In Equation 1.3, $\alpha$ is a constant associated with the phase noise power, and $w_n$ is a random variable, optionally with a unity-variance white Gaussian density. The present invention works as well with other phase noise models, and we shall use the random-walk model in our examples for purpose of explanation.

Returning to Equation 1.2, the receiver 35 estimates the phase rotation $\theta_n$ in order to estimate the transmitted symbols.

In example embodiments of the invention, estimation is performed using both pilot symbols and data symbols simultaneously.

After phase estimation the pilot symbols are optionally removed.

Figure 2A:
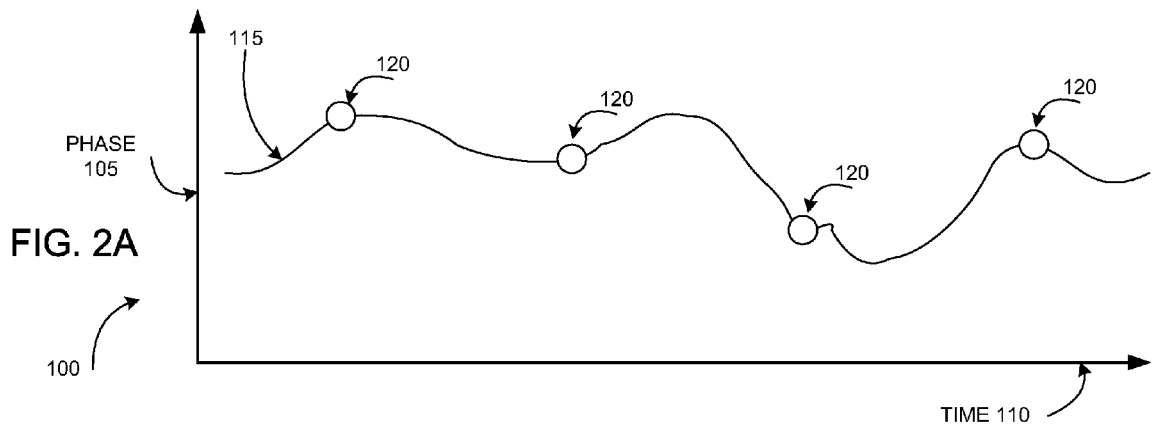
FIG. 2A is a simplified graph of an actual carrier phase trajectory and noiseless pilot symbol phases.

Reference is now made to FIG. 2A, which is a simplified graph 100 of an actual carrier phase trajectory 115 and noiseless received pilot symbol phases 120.

The graph 100 includes a qualitative phase axis 105, a qualitative time axis 110, and depicts the actual carrier phase trajectory 115. Several pilot symbols are included in the time period depicted in FIG. 1A, and phases of the pilot symbols, as they would be measured at the receiver when no additive noise is present, are depicted as noiseless received pilot symbol phases 120.

The carrier phase trajectory 115 passes through the noiseless received pilot symbol phases 120.

FIG. 2A describes a carrier phase trajectory of a signal which includes pilot symbols, and as such, depicts a situation which also exists in prior art communication systems.

Figure 2B:
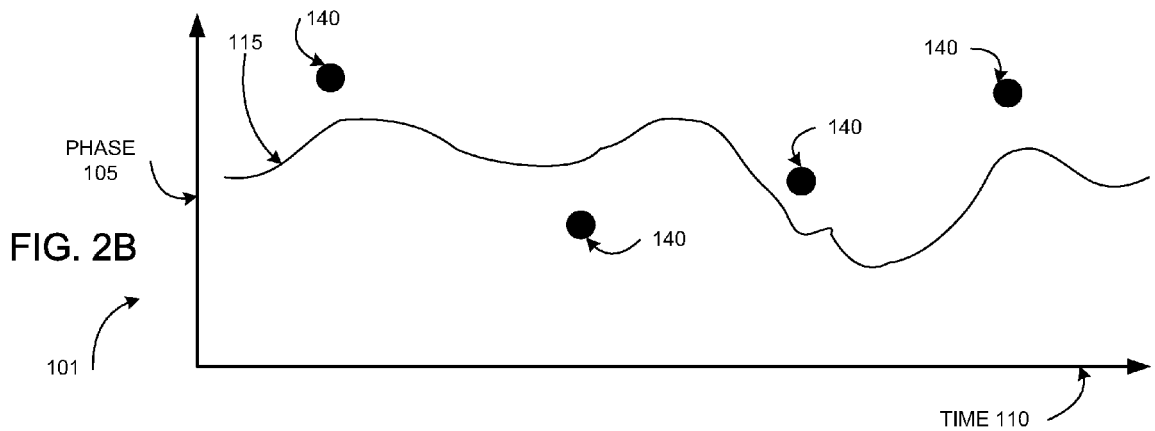
FIG. 2B is a simplified graph of a carrier phase trajectory and noisy received pilot symbol phases at a receiver.

Reference is now made to FIG. 2B, which is a simplified graph 101 of a carrier phase trajectory 115 and noisy received pilot symbol phases 140 at a receiver.

As in FIG. 2A, the graph 100 includes a qualitative phase axis 105, a qualitative time axis 110, and depicts an actual carrier phase trajectory 115.

Several received pilot symbols are included in the time period depicted in FIG. 2A, and phases of the received pilot symbols, as they would be measured at the receiver in the presence of additive noise, are depicted as received pilot symbol phases 140.

The actual carrier phase trajectory 115 does not usually pass through the noisy received pilot symbol phases 140, due to additive noise at the receiver.

Figure 3:
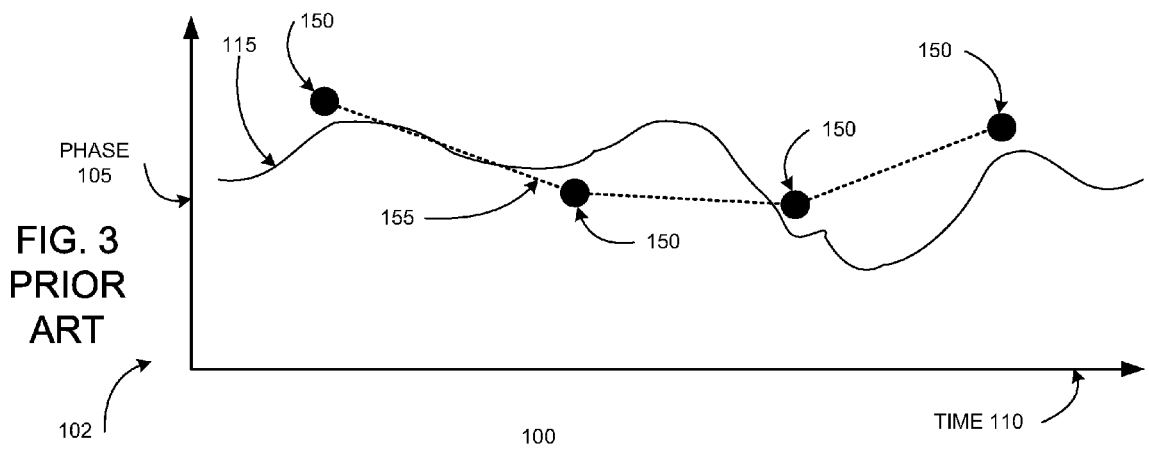
FIG. 3 is a simplified graph of a carrier phase trajectory, filtered received pilot symbol phases at a receiver, and a prior art pilot-symbol-based phase trajectory estimation.

Reference is now made to FIG. 3, which is a simplified graph 102 of an actual carrier phase trajectory 115, filtered received pilot symbol phases 150 at a receiver, and a prior art pilot-symbol-based phase trajectory estimation 155.

As in FIG. 2A, the graph 102 includes a qualitative phase axis 105, a qualitative time axis 110, and depicts the actual carrier phase trajectory 115.

Several received pilot symbols are included in the time period depicted in FIG. 3, and phases of the received pilot symbols, as they would be measured after a filter, such as a Wiener filter, at the receiver, are depicted as received pilot symbol phases 150. The filtered received pilot symbol phases 150 are usually closer to the carrier phase trajectory 115 than the received pilot symbol phases 140 of FIG. 2B because the filter usually reduces the noise effect, which distanced the received pilot symbol phases 140 from the carrier phase trajectory 115 in FIG. 2B.

Linear interpolation between the filtered received pilot symbol phases 150 provides a linear estimate of the carrier phase trajectory 115.

In order to produce the linear estimate of the carrier phase trajectory 115 between the filtered received pilot symbol phases 150, the pilot symbols are extracted; an unwrapped phase estimate at the pilot symbol instances is calculated; the phase at the pilot symbol instances is filtered, for example with a Wiener filter; and straight line values are interpolated between the filtered phase values, using a linear interpolator.

FIG. 3 demonstrates that while the linear estimate of the carrier phase trajectory 115 is acceptable at the pilot symbol phases 150, the error in the linear estimate of the carrier phase trajectory 115 between the pilot symbol phases 150 may be quite large.

Figure 4A:
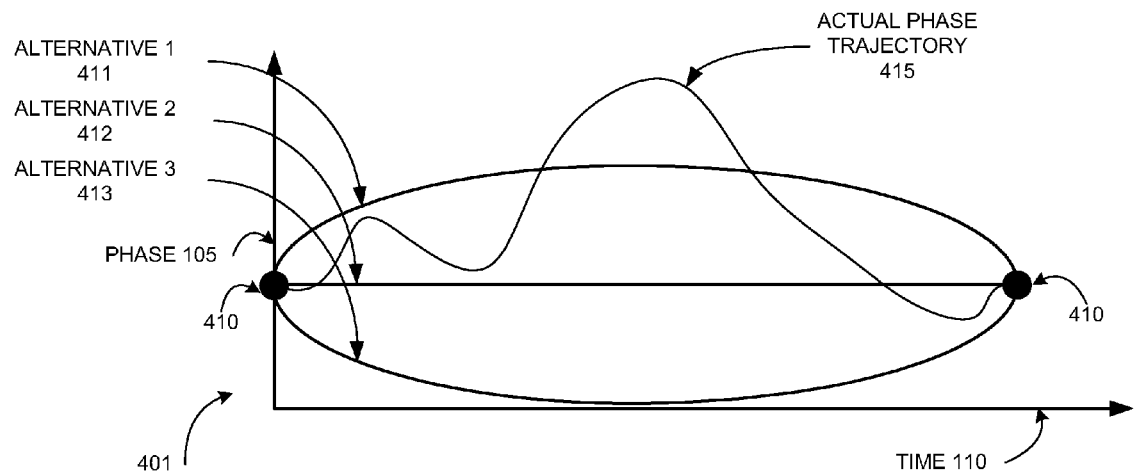
FIG. 4A is a simplified graph of an actual carrier phase trajectory and of several alternative carrier phase trajectory estimations between two filtered received pilot symbol phases.

Reference is now made to FIG. 4A, which is a simplified graph 401 of an actual carrier phase trajectory 415 and of several alternative carrier phase trajectory estimations 411, 412, 413 between two filtered received pilot symbol phases 410.

As in FIG. 2A, the graph 401 includes a qualitative phase axis 105, a qualitative time axis 110, and the actual carrier phase trajectory 415.

FIG. 4A depicts several alternative carrier phase trajectory estimations 411, 412, 413 between the two filtered received pilot symbol phases 410.

Alternative 2 412 appears to be a linear estimation between the two filtered received pilot symbol phases 410, and in that it is similar to the prior art pilot-symbol-based phase trajectory estimation 155 depicted in FIG. 3.

Alternative 1 411 and alternative 3 413 are non-linear, smooth function interpolations between the two filtered received pilot symbol phases 410.

In some embodiments of the invention a selection is made between two or more alternative carrier phase trajectory estimations. The selection is optionally made based, at least in part, on one or more criteria. One example criteria is that of minimizing the error, or distance, between a carrier phase trajectory estimation such as the carrier phase trajectory estimations 411, 412, 413 and the actual carrier phase trajectory 415.

The actual carrier phase trajectory 415 is typically not known. One way to estimate the actual carrier phase trajectory 415 is by making a decision-directed phase estimate.

In some embodiments of the invention, instead of estimating actual phase in a decision-directed fashion, the mean-square-error for a section between two consecutive pilot symbols is evaluated using decisions associated with several alternatives of smooth curves. A smooth curve in which the mean square error is minimized is selected as the "right" decision.

Once an alternative is selected as the curve—decisions are completely determined. The MSE is estimated with these decisions. A different curve may also be selected, optionally incurring different decisions, associated with the different curve). Due to the different decisions a different MSE is optionally incurred. The curve which provides the best MSE is optionally selected.

The above method is useful in embodiments where decisions cannot be made about symbols. For example—in case of transmitting in dual polarization mode, symbols in one-polarization leak into the other and vice versa. A receiver optionally separates polarized signals by subtracting an interference of one polarization from the other. However, if the two polarization-signals are down-converted using separate oscillators, the phase of the down-converted signals may be different for each polarization. Typically, the interfering signal is weaker than the main signal in each polarization. In a previous patent application by the same assignee, a method was taught for estimating phase of pilot symbols embedded in an interfering signal while a main signal is deliberately silenced using a "silent" pilot symbol. The method included using linear interpolation between the pilot symbols of the interferer. Since the interferer is completely cancelled out after subtraction a decision cannot be made about its data symbols. However, a few alternatives can be tried, such as in FIG. 4A, and the phase of the interfering signal which provides the best MSE for the main signal is selected.

In some embodiments of the invention a method for determining the phase trajectory between two consecutive pilot symbols is based on evaluating the phase error of the data symbols derived by a decision-directed method, and using curve fitting techniques to fit a smooth curve to the evaluated phase trajectory.

Figure 4B:
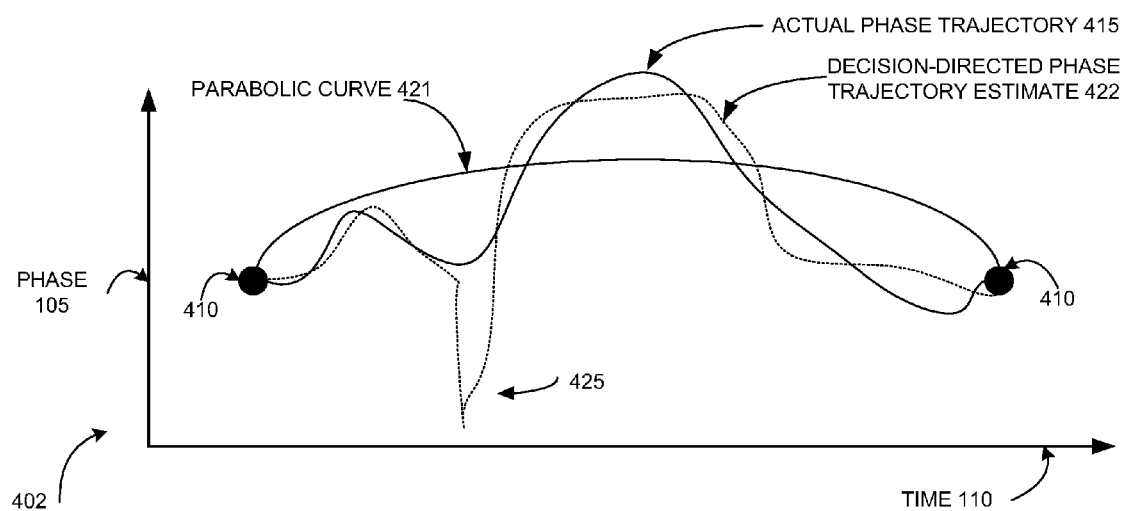
FIG. 4B is a simplified graph of an actual carrier phase trajectory, of an alternative carrier phase trajectory estimation, and of a decision-directed phase trajectory estimate between two filtered received pilot symbol phases.

Reference is now made to FIG. 4B, which is a simplified graph 402 of an actual carrier phase trajectory 415, of an alternative carrier phase trajectory estimation 421, and of a decision-directed phase trajectory estimate 422 between two filtered received pilot symbol phases 410.

As in FIG. 2A, the graph 402 includes a qualitative phase axis 105, a qualitative time axis 110, and the actual carrier phase trajectory 415.

FIG. 4B depicts an alternative carrier phase trajectory estimation 421 between the two filtered received pilot symbol phases 410. The alternative carrier phase trajectory estimation 421 is, by way of a non-limiting example, a parabolic curve fitted to the decision-directed phase trajectory estimate 422 between the two filtered received pilot symbol phases 410.

It is noted that a parabolic curve is a function of the second degree, that is, contains elements raised to the second power. In some embodiments of the invention parabolic curves are used to generate carrier phase trajectory estimations, while in some embodiments of the invention functions of degrees higher than the second degree are used to generate carrier phase trajectory estimations.

FIG. 4B also depicts the decision-directed phase trajectory estimate 422, and a section of the decision-directed phase trajectory estimate 422 in which one or more decision errors 425 are made, causing a great deviation between the decision-directed phase trajectory estimate 422 and the actual carrier phase trajectory 415.

Non-limiting examples of mathematical functions suitable for carrier phase trajectory estimation include polynomial functions of a first degree (linear), second degree, and higher than second degrees; trigonometric functions such as sine functions and their equivalents; and so on.

In some embodiments of the invention a carrier phase trajectory is optionally estimated based on methods from the field of statistical signal processing.

In one such embodiment, by way of a non-limiting example, an estimate of the phase of each symbol is optionally made by incorporating a statistical model of additive noise and phase noise with phase estimates of data and pilot symbols, using a Kalman filter. Optionally two steps are performed for each new symbol: a first step in which a phase of a following symbol is predicted according to a phase of a current symbol and a statistical model of the phase noise and estimation noise; and a second step in which the predicted value is corrected according to a measured phase of the following symbol and the statistical model of the additive noise.

In other embodiments of the invention a carrier phase trajectory is estimated based on another method from the field of statistical signal processing. A Weighted Least-Squares estimation is made for a phase of each data symbol. The phase of a symbol is optionally approximated based on a phase of adjacent symbols plus some noise. It is expected that the larger the separation between the symbol being estimated and an adjacent symbol based upon which the estimation is being made—the larger the noise. A statistical model of the phase noise enables expressing the noise mathematically. A Weighted Least-Squares is a well known method for estimating the phase of the symbol in question and is well suited for this case.

Figure 4C:
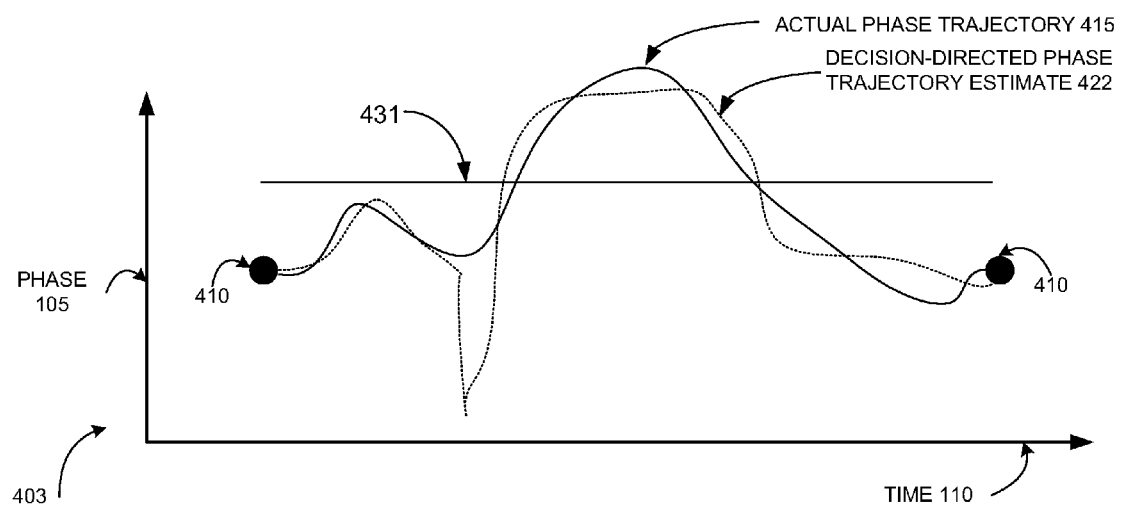
FIG. 4C is a simplified graph of an actual carrier phase trajectory, of another alternative carrier phase trajectory estimation, and of a decision-directed phase trajectory estimate between two filtered received pilot symbol phases.

Reference is now made to FIG. 4C, which is a simplified graph 403 of an actual carrier phase trajectory 415, of another alternative carrier phase trajectory estimation 431, and of a decision-directed phase trajectory estimate 422 between two filtered received pilot symbol phases 410.

As in FIG. 2A, the graph 403 includes a qualitative phase axis 105, a qualitative time axis 110, and the actual carrier phase trajectory 415.

The alternative carrier phase trajectory estimation 431 is a linear approximation of the phase trajectory, in which the linear approximation does not pass through the received pilot symbol phases 410, that is, the linear approximation is offset from a line connecting the received pilot symbol phases 410.

It is noted that the linear approximation with an offset provides excellent performance, as may be seen in FIG. 4C. In some cases the linear approximation with an offset provides even better performance than that of a sine-wave approximation.

The phase trajectory estimation 431 is optionally found by linear trajectory fitting to the decision directed estimated phase, with NO requirement of passing through the pilot symbols phases 410.

Figure 4D:
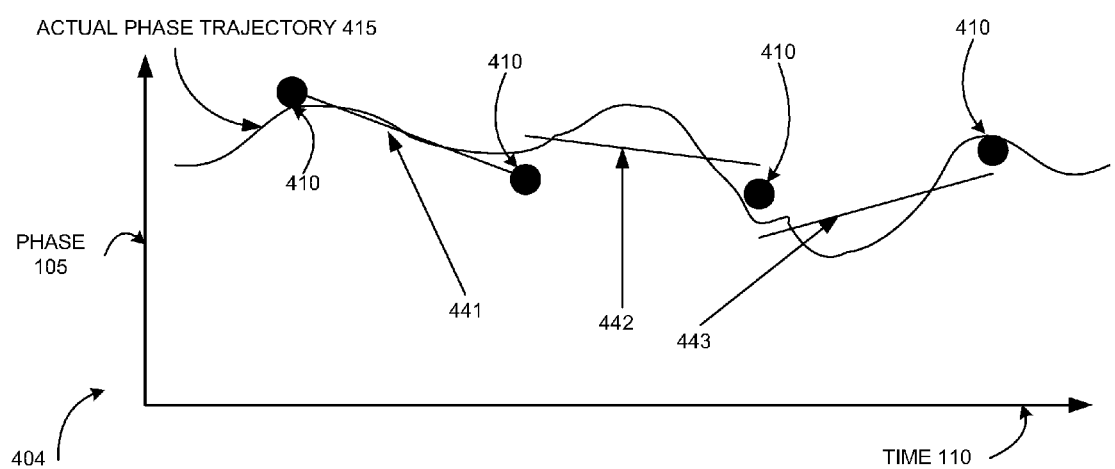
FIG. 4D is a simplified graph of an actual carrier phase trajectory, and of several alternative carrier phase trajectory estimations between four filtered received pilot symbol phases.

Reference is now made to FIG. 4D, which is a simplified graph 404 of an actual carrier phase trajectory 415, and of several alternative carrier phase trajectory estimations 441 442 443 between four filtered received pilot symbol phases 410.

As in FIG. 2A, the graph 404 includes a qualitative phase axis 105, a qualitative time axis 110, and the actual carrier phase trajectory 415.

The estimated phase trajectories 441 442 443 are not continuous. The estimated phase trajectory now has "jumps" at locations of the pilot symbol phases 410. Nevertheless, the estimation is excellent, being close to the actual carrier phase trajectory 415, as can be seen in FIG. 4D.

It is noted that an exact fitting of the estimated phase trajectories to the pilot symbol phases 410 is optionally not required. The pilot symbol phases 410 make it possible to get decision-directed phase estimates every so often. From the decision-directed phase estimates at the pilot symbols, smooth curves which do not necessarily pass through the pilot symbols are derived, including linear curves, polynomial curves, and trigonometric function curves.

Reference is again made to FIG. 4B. In some embodiments of the invention, the decision-directed phase trajectory estimate 422 is made by removing phase outliers, such as at the decision error 425, before estimating the phase trajectory 422. The estimating of the phase trajectory 422 may optionally be made by curve fitting or by deriving DST or Fourier coefficients.

It is noted that wherever a DST is mentioned in the specification and claims, a Fourier transform may also be used, and other trigonometric-based transform such as a Discrete Cosine Transform, with mathematical amendments as are known to persons skilled in the art.

Figure 4E:
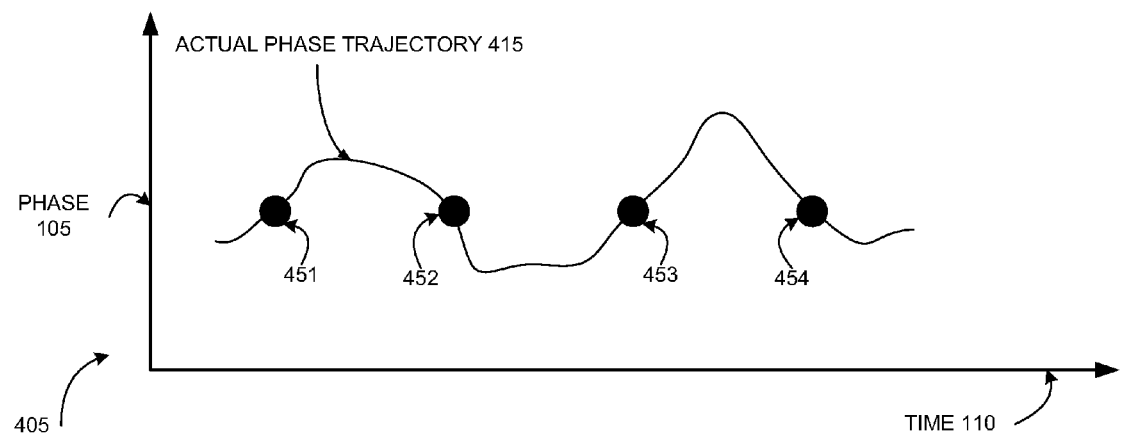
FIGS. 4E, 4F, and 4G are simplified graphs of an actual carrier phase trajectory, and an example data symbol window between several consecutive pilot symbols.
Figure 4F:
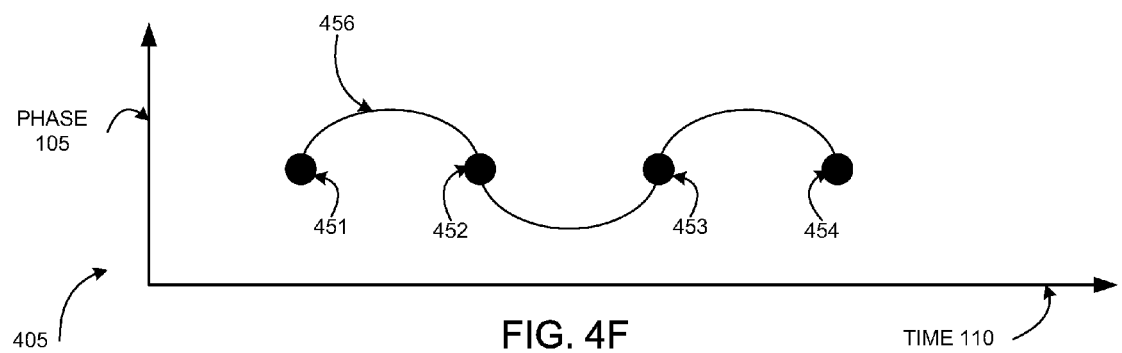
Figure 4G:
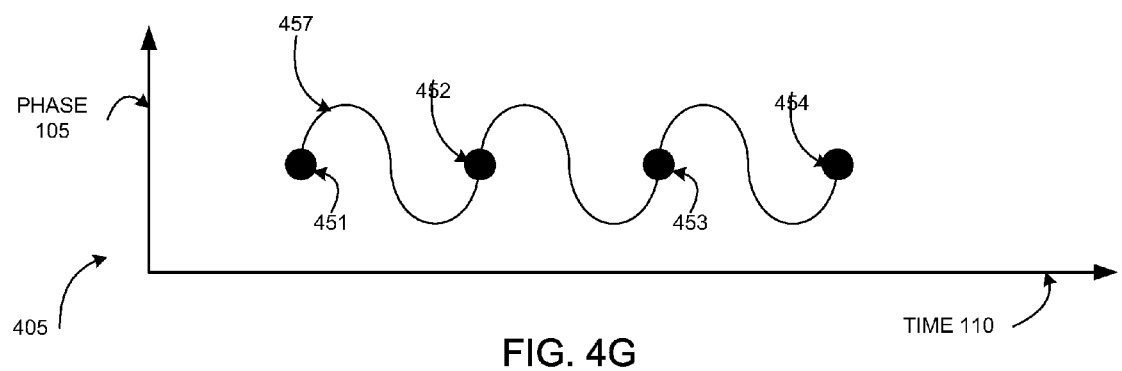

Reference is now made to FIGS. 4E, 4F, and 4G, which are simplified graphs 405 of an actual carrier phase trajectory 415, and an example data symbol window between several consecutive pilot symbols 451 452 453 454.

As in FIG. 2A, the graphs 405 includes a qualitative phase axis 105, a qualitative time axis 110, and the actual carrier phase trajectory 415.

FIGS. 4E, 4F, and 4G also depict four consecutive pilot symbols 451 452 453 454.

In some embodiments of the invention the data symbol window includes a number of data symbols and/or pilot symbols between more than two adjacent pilot symbols.

FIG. 4E depicts four consecutive pilot symbols 451 452 453 454, and optionally the phases of all four of the consecutive pilot symbols 451 452 453 454 are used for estimating the phase trajectory between the two middle two pilot symbols 452 453.

FIG. 4F depicts a smooth phase trajectory 456 passing through the four consecutive pilot symbols 451 452 453 454, produced using a sine wave at a frequency of ½ cycle for interval between pilot symbols.

FIG. 4G depicts a smooth phase trajectory 457 passing through the four consecutive pilot symbols 451 452 453 454, produced using a sine wave at a frequency of 1 cycle for interval between pilot symbols.

In some embodiments of the invention one of the smooth phase trajectories 456 457 is used for an estimation of carrier phase trajectory.

In some embodiments of the invention one of the smooth phase trajectories 456 457 is used for an estimation of carrier phase trajectory, together with a decision-directed estimate which uses only the data symbols between the two middle two pilot symbols 452 453, expanding upon the embodiments described above with reference to FIG. 4C and FIG. 4D.

In some embodiments of the invention one of the smooth phase trajectories 456 457 is used for an estimation of carrier phase trajectory, together with a decision-directed estimate which uses more than just the data symbols between the two middle two pilot symbols 452 453, for example all or part of the data symbols between all four of the consecutive pilot symbols 451 452 453 454, expanding upon the embodiments described above with reference to FIG. 4C and FIG. 4D.

Some non-limiting examples of methods used to select an alternative carrier phase trajectory include: optionally measuring a mean-square-error (MSE) of received symbols of a trajectory section; optionally measuring symbol-error-rate (SER) of the received symbols within the trajectory section; and optionally measuring variance of the decision-directed phase error of the received symbols within the section.

In some embodiments of the invention DST coefficients are derived based on the estimated decision-directed phase error trajectory, and a smooth trajectory is constructed using some of the DST coefficients of the decision-directed phase error trajectory. The method is demonstrated in FIG. 5A below, and also exemplified by simulation results.

Equations for deriving the DST coefficients are hereby presented. For N data symbols, the DST coefficients $C_k$ are given by:

$$C_k = \sum_{n=0}^{N-1} \hat{\theta}_n \cdot \sin\left(k\pi \cdot \frac{n}{N}\right) \quad \text{Equation 2.1}$$

$$k = 1, 2, \ldots$$

where $\hat{\theta}_n$ denotes a decision-directed phase of an $n^{th}$ symbol.

A sine function which corresponds to a coefficient k is generated using:

$$\theta_k(n) = \frac{2}{N} \cdot \sin\left(k\pi \cdot \frac{n}{M}\right) \quad \text{Equation 2.2}$$

In some embodiments of the invention Fourier coefficients are derived based on the estimated decision-directed phase error trajectory, and a smooth trajectory is constructed using some of the Fourier coefficients of the decision-directed phase error trajectory.

Figure 5A:
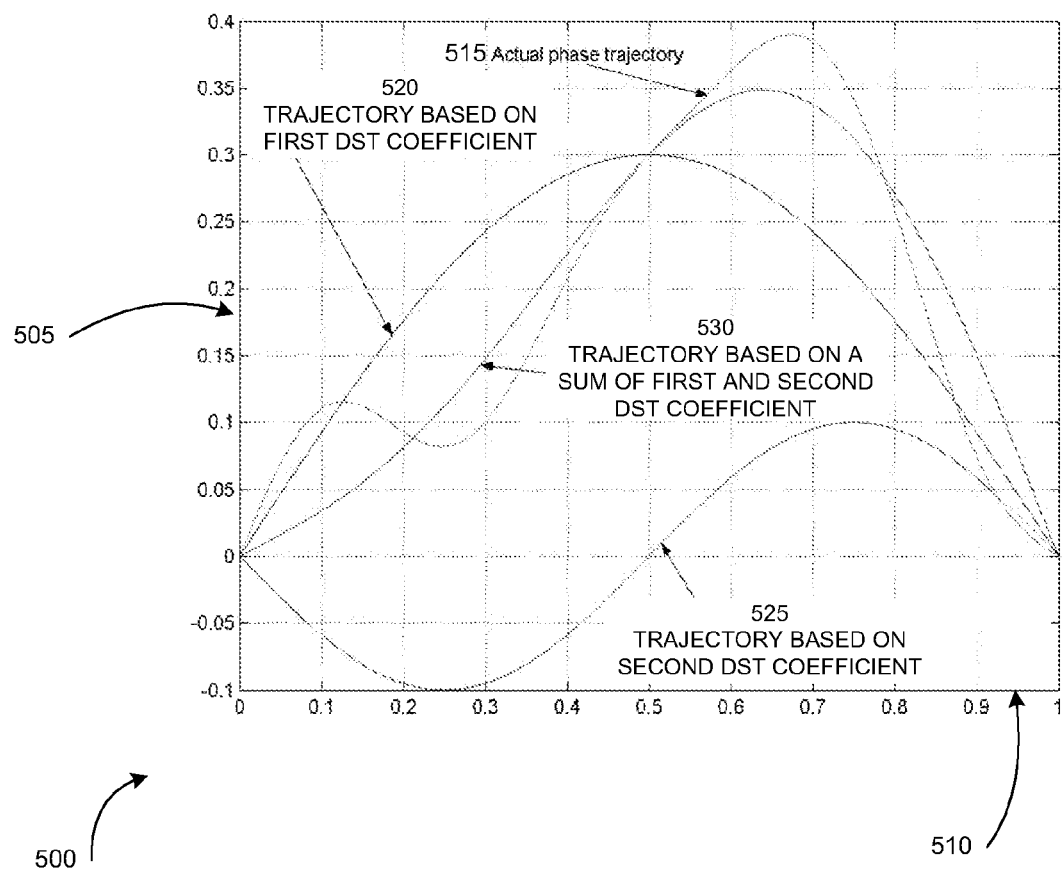
FIG. 5A is a simplified graph of a simulated carrier phase trajectory and of several alternative carrier phase trajectory estimations based on Discrete Sine Transform (DST) coefficients.

Reference is now made to FIG. 5A, which is a simplified graph 500 of a simulated carrier phase trajectory 515 and of several alternative carrier phase trajectory estimations 520, 525, 530 based on DST coefficients.

The graph 500 includes a phase axis 505 and a time axis 510, and a simulated carrier phase trajectory 515.

The units of the phase axis 505 are arbitrary units.

The units of the time axis 510 are arbitrary, between 0, which is a time of a first pilot symbol, and 1, which is a time of a second, following, pilot symbol.

The value of the simulated carrier phase trajectory 515 is zero at both time=0 and at time=1, since we are assuming that the phase is exactly known at pilot symbols.

It is noted that an error may also exist in the phase of the pilot symbols, due to additive noise. When, as is often the case, the additive noise is weak relative to phase noise, it is good practice to neglect the additive noise when estimating the phase of the pilot symbols.

FIG. 5A depicts a trajectory based a first DST coefficient 520, a trajectory based a second DST coefficient 525, and a trajectory based a sum (linear combination) of the first DST coefficient and the second DST coefficient 530.

In some embodiments of the invention determining the phase trajectory between two consecutive pilot symbols is based on a combination of two or more phase trajectory estimation methods such as described above, with statistical constraints or guide-lines on how to select the combination. The guide lines are optionally based on properties of the phase noise and/or of the data symbols.

A non-limiting example for properties of phase noise is the spectral density of the phase noise.

A non-limiting example for properties of the data symbols, with which the decision-directed phase estimate is obtained, is the spectral density and distribution of the data symbols. By way of a non-limiting example, in a communication channel which is used for voice communication, a different spectral distribution is to be found than in a communication channel which is used for video communication.

A non-limiting example for properties of the noise, with which the decision-directed phase estimate is obtained, is the spectral density and distribution of the additive noise. The additive noise can be spectrally characterized, both off-line, in a laboratory, and on-line, in use in an installed communication system.

In some embodiments of the invention, when the spectral characteristics of the additive noise are known, DST coefficients corresponding to the spectral distribution are selected to avoid the spectral components of the additive noise and a linear combination of the remaining DST coefficients is used to produce the carrier phase trajectory estimation.

Some embodiments of the invention include defining the number of DST coefficients, in the method described above with reference to FIG. 5A, according to statistical properties of the additive noise and/or the phase noise. In theory the more DST coefficients used to produce the carrier phase trajectory estimate, the better tracking of the phase trajectory. It is noted that with additional DST coefficients comes an increase in sensitivity to the additive noise, since it is possible to track the additive noise as well.

In some embodiments of the invention an optimal, fixed, number of coefficients of DST coefficients are used for producing an estimated phase trajectory. Optionally, the number of DST coefficients is fixed at a small number, such as 1, 2, or three, similarly to the depiction in the examples in FIG. 5A. In some embodiments of the invention the optimal number of DST coefficients is discovered by simulating phase noise and simulating the estimation of a phase trajectory.

In some embodiments of the invention, when the phase trajectory is a combined phase trajectory based on a sum of two or more trigonometric phase trajectories, the combined phase trajectory is produced by adding the coefficients of the two or more trigonometric phase trajectories per corresponding frequency.

In some embodiments of the invention, when the phase trajectory is a combined phase trajectory based on a sum of different types of phase trajectories, such as, by way of a non-limiting example, one or more trigonometric phase trajectories and one or more polynomial phase trajectories, a weighted sum is optionally used. The weighted sum uses a weight for each trajectory, optionally such that a sum of the weights is one.

Based on the above description, a few non-limiting methods for estimating phase of a carrier wave in a QAM modulation receiver are detailed below.

Figure 5B:
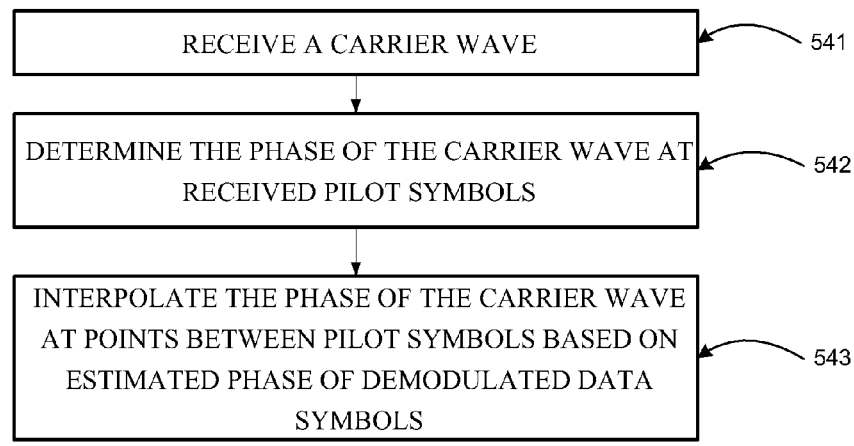
FIG. 5B is a method for a receiver to estimate phase of a carrier wave, operating according to an example embodiment of the present invention.

Reference is now made to FIG. 5B, which is a method for a receiver to estimate phase of a carrier wave, operating according to an example embodiment of the present invention.

A carrier wave, which includes pilot symbols and data symbols, is received (541).

A determination is made of the phase of the carrier wave at received pilot symbols (542).

At points between the pilot symbols, the phase of the carrier wave is interpolated, based, at least in part, on estimated phase of demodulated data symbols (543).

The estimated phase of demodulated data symbols is optionally performed by a decision-directed manner—comparing received phase to expected phase of the decoded data symbol.

It is noted that the method of FIG. 5B, as well as additional methods for estimating phase of a carrier wave which are described below with reference to additional figures, are optionally implemented in a phase estimator such as the phase estimator 41 of FIG. 1.

Figure 5C:
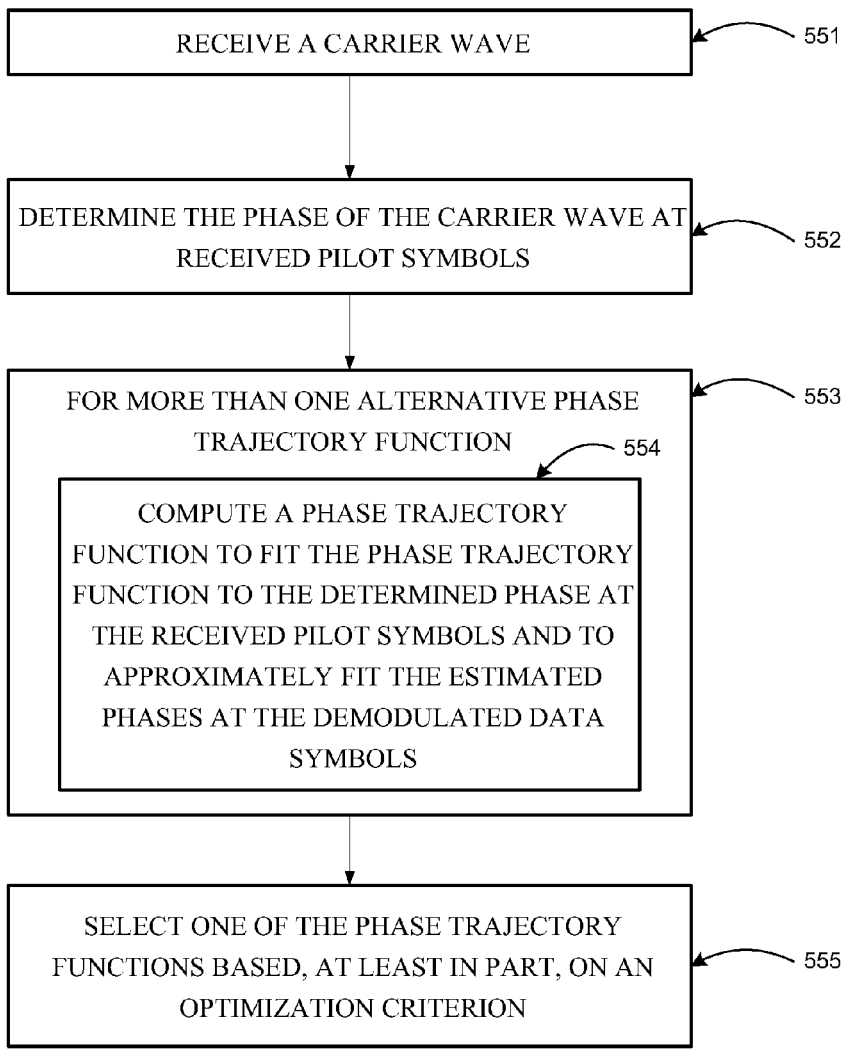
FIG. 5C is another method for a receiver to estimate phase of a carrier wave, operating according to another example embodiment of the present invention.

Reference is now made to FIG. 5C, which is another method for a receiver to estimate phase of a carrier wave, operating according to another example embodiment of the present invention.

A carrier wave, which includes pilot symbols and data symbols, is received (551).

A determination is made of the phase of the carrier wave at received pilot symbols (552).

More than one alternative phase trajectory functions are produced and considered (553).

In some embodiments of the invention, producing the alternative phase trajectory functions is performed by computing a phase trajectory function to substantially exactly fit the phase trajectory function to the determined phase at the received pilot symbols, and to approximately fit the estimated phases at the demodulated data symbols (554).

In some other embodiments of the invention, producing the alternative phase trajectory functions is performed by computing a smooth phase trajectory function to approximately fit the phase trajectory function to the determined phase at the received pilot symbols, and to approximately fit the estimated phases at the demodulated data symbols (554).

Optionally, one of the phase trajectory functions is selected, based, at least in part, on an optimization criterion.

The optimization criterion may optionally be as described above with reference to FIG. 4B, the example methods used to select an alternative carrier phase trajectory.

Figure 5D:
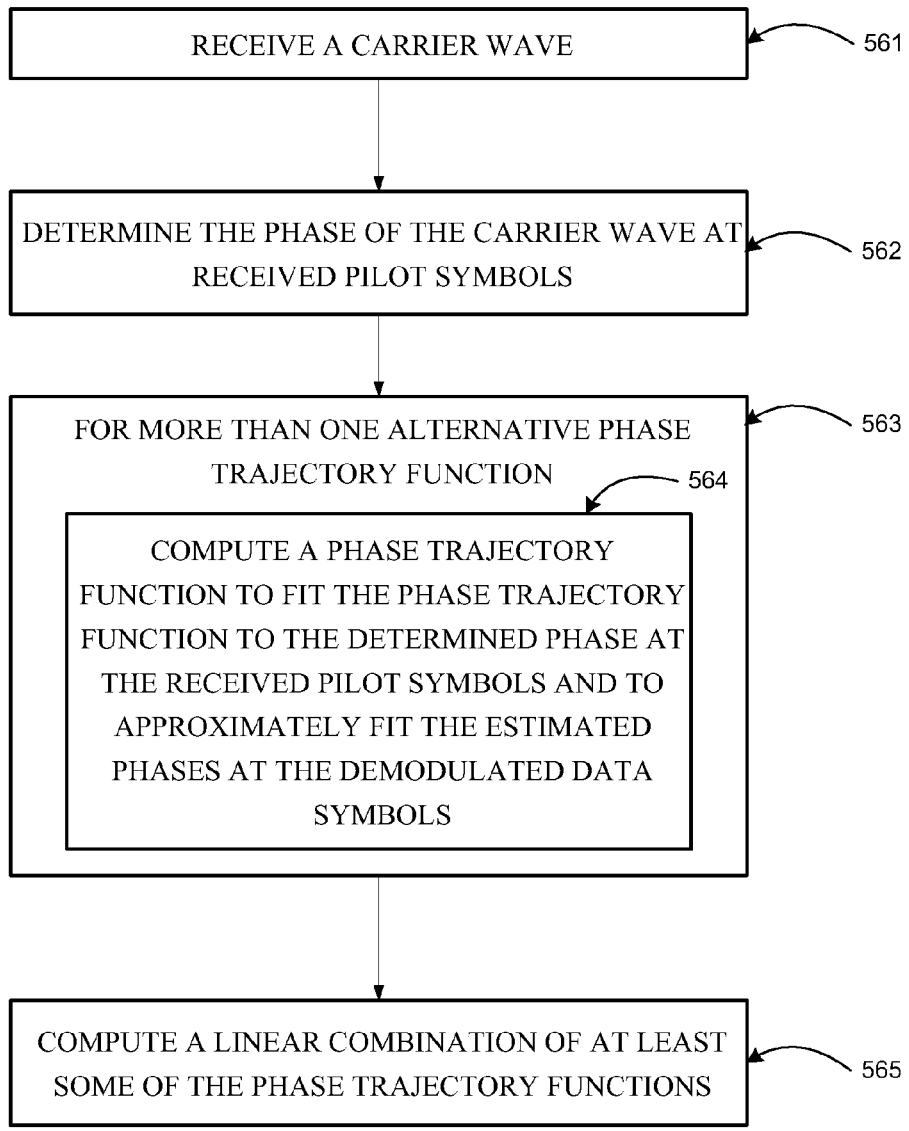
FIG. 5D is yet another method for a receiver to estimate phase of a carrier wave, operating according to yet another example embodiment of the present invention.

Reference is now made to FIG. 5D, which is yet another method for a receiver to estimate phase of a carrier wave, operating according to yet another example embodiment of the present invention.

A carrier wave, which includes pilot symbols and data symbols, is received (561).

A determination is made of the phase of the carrier wave at received pilot symbols (562).

More than one alternative phase trajectory functions are produced and considered (563).

In some embodiments of the invention producing the alternative phase trajectory functions is performed by computing a phase trajectory function to substantially exactly fit the phase trajectory function to the determined phase at the received pilot symbols, and to approximately fit the estimated phases at the demodulated data symbols (564).

In other embodiments of the invention producing the alternative phase trajectory functions is performed by computing a phase trajectory function to approximately fit the phase trajectory function to the determined phase at the received pilot symbols, and to approximately fit the estimated phases at the demodulated data symbols (564).

Optionally, a linear combination of at least some of the phase trajectory functions is computed (565). When the trajectory is a linear combination of several phase trajectory functions—the basic trajectories optionally do not need to match, not even approximately, the decision-directed phases. Optionally, only the linear combination of the phase trajectory functions has to substantially match the decision-directed phases.

Figure 5E:
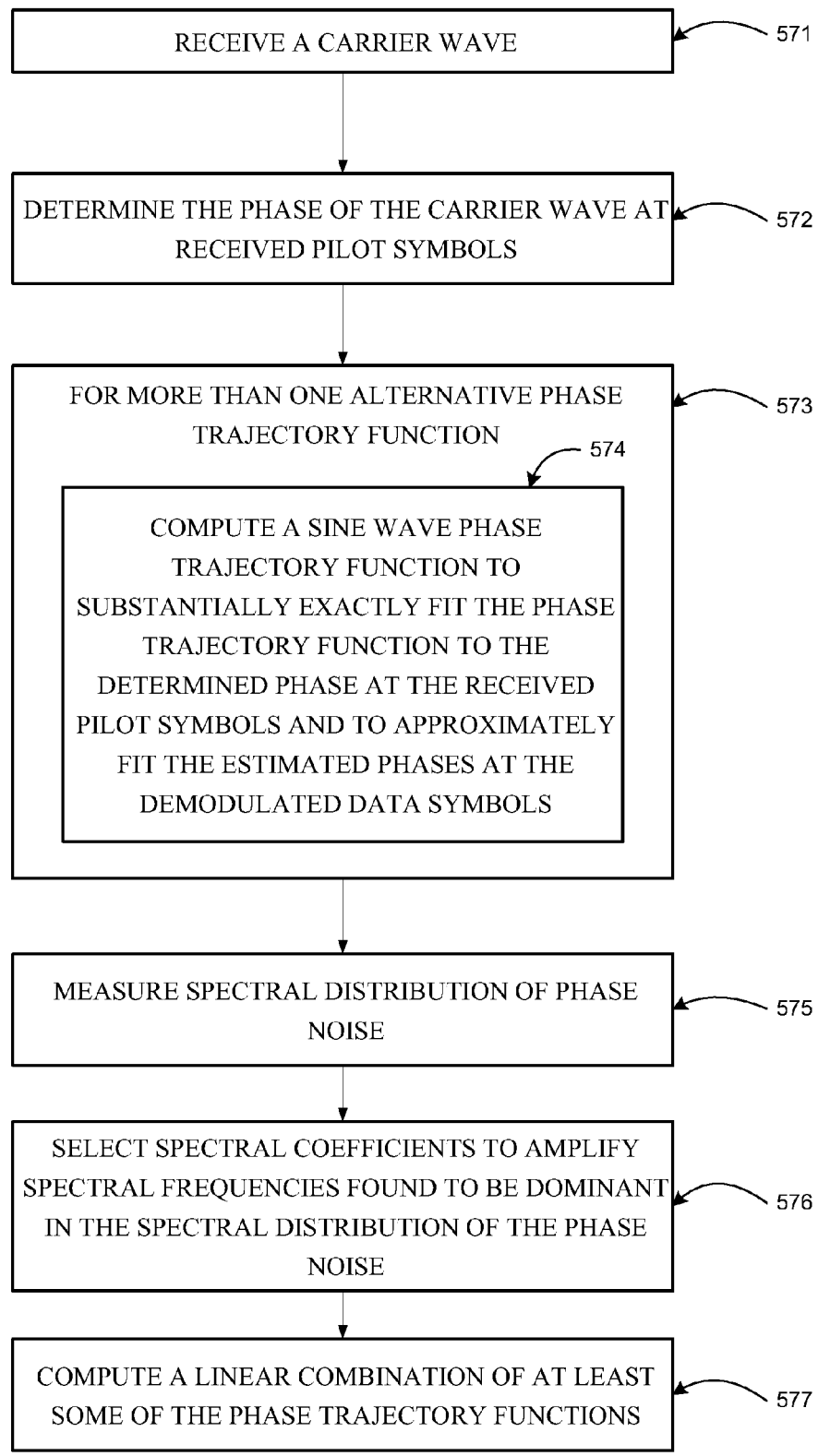
FIG. 5E is still another method for a receiver to estimate phase of a carrier wave, operating according to still another example embodiment of the present invention.

Reference is now made to FIG. 5E, which is still another method for a receiver to estimate phase of a carrier wave, operating according to still another example embodiment of the present invention.

The method includes the following:

Receive a carrier wave, which includes pilot symbols and data symbols (571).

Determination the phase of the carrier wave at received pilot symbols (572).

For more than one alternative phase trajectory function, produce and consider: (573).

In some embodiments of the invention, produce the more than one alternative phase trajectory function by computing a sine wave phase trajectory function to substantially exactly fit the phase trajectory function to the determined phase at the received pilot symbols, and to approximately fit the estimated phases at the demodulated data symbols (574).

In some other embodiments of the invention, produce the alternative phase trajectory functions by computing a sine wave phase trajectory function to approximately fit the phase trajectory function to the determined phase at the received pilot symbols, and to approximately fit the estimated phases at the demodulated data symbols (574).

Measure spectral distribution of the phase noise (575), or read the spectral distribution of the phase noise from a database.

Select spectral coefficients, such as DST coefficients, corresponding to peaks in the spectral density of the phase noise, so as to amplify spectral frequencies found to be dominant in the spectral density of the phase noise (576).

Compute a linear combination of at least some of the phase trajectory functions (577), by summing products of the selected spectral coefficients and corresponding sine wave phase trajectory functions.

Figure 5F:
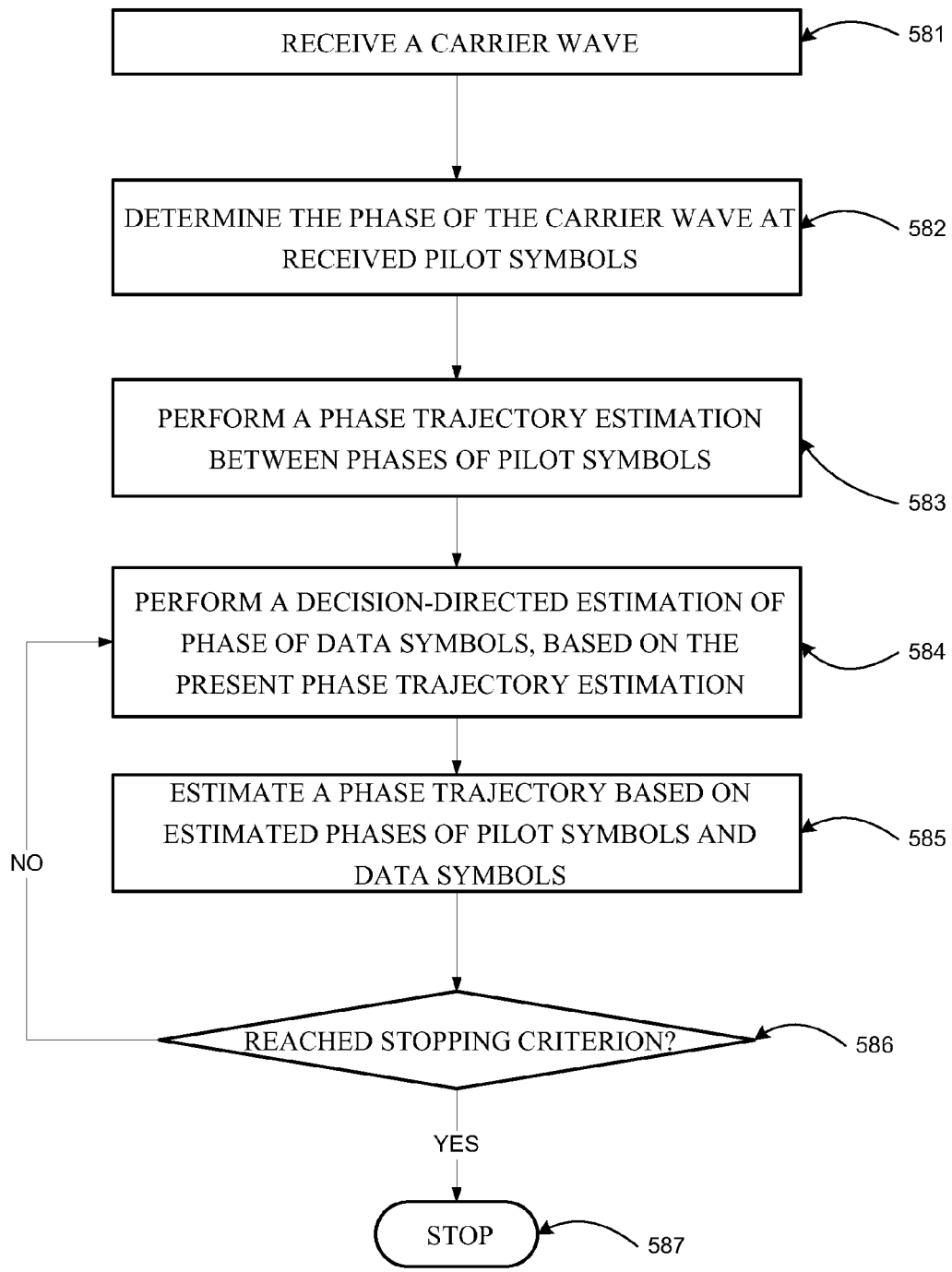
FIG. 5F is yet another method for a receiver to estimate phase of a carrier wave, operating according to still another example embodiment of the present invention.

Reference is now made to FIG. 5F, which is yet another method for a receiver to estimate phase of a carrier wave, operating according to still another example embodiment of the present invention.

The method includes the following:

Receive a carrier wave, which includes pilot symbols and data symbols (581).

Determine the phase of the carrier wave at received pilot symbols (582).

A phase trajectory estimation is performed between the phases of pilot symbols, using, by way of a non-limiting example, a linear interpolation (583).

A decision-directed estimation of the phase of data symbols is performed, based on the present phase trajectory estimation (584).

A phase trajectory is estimated based on estimated phases of both pilot symbols and data symbols (585).

A test whether a stopping criterion has been reached (586).

If yes, stop (587), if not, repeat actions (584) (585) (586).

The stopping criterion is optionally a test whether additional iterations are useful. By way of a non-limiting example, a stopping criterion is reached when all data symbols are decoded without error, optionally according to an error checking scheme such as a CRC. By way of another non-limiting example, a stopping criterion is reached when a difference between estimated phases of one iteration at data symbols and estimated phases of a later iteration at the data symbols is less than a threshold difference.

In yet another embodiment of the present invention, the decision-directed estimation of the phase of data symbols (584) according to the above method is performed, based on the present phase trajectory estimation and also based on using error correction code.

In some cases error correction code provides correct data, and there is no need for phase estimation. In some cases, such as is typical with LDPC and Turbo codes, the error-correcting code is capable of correcting only some of the data symbols, and the phase estimation method described above with reference to FIG. 5F is performed.

It is expected that during the life of a patent maturing from this application many relevant phase-and-amplitude modulation schemes will be developed, and the use of the term Quadrature Amplitude Modulation (QAM) is intended to include all such new technologies a priori.

The terms "comprising", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a unit" or "at least one unit" may include a plurality of units, including combinations thereof.

The words "exemplary" and "example" are used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

EXAMPLES

Reference is now made to the following examples, which together with the above descriptions illustrate some embodiments of the invention in a non limiting fashion.

The following figures demonstrate simulation results with the method in which Discrete-Sine-Transform coefficients of the decision-directed phase error are derived and employed in generating an estimated phase trajectory.

The simulations demonstrate a 256 QAM constellation at a thermal Signal to Noise Ratio (SNR) of 35 dB. The pilot symbols are spaced 30 data symbols apart.

Figure 6A:
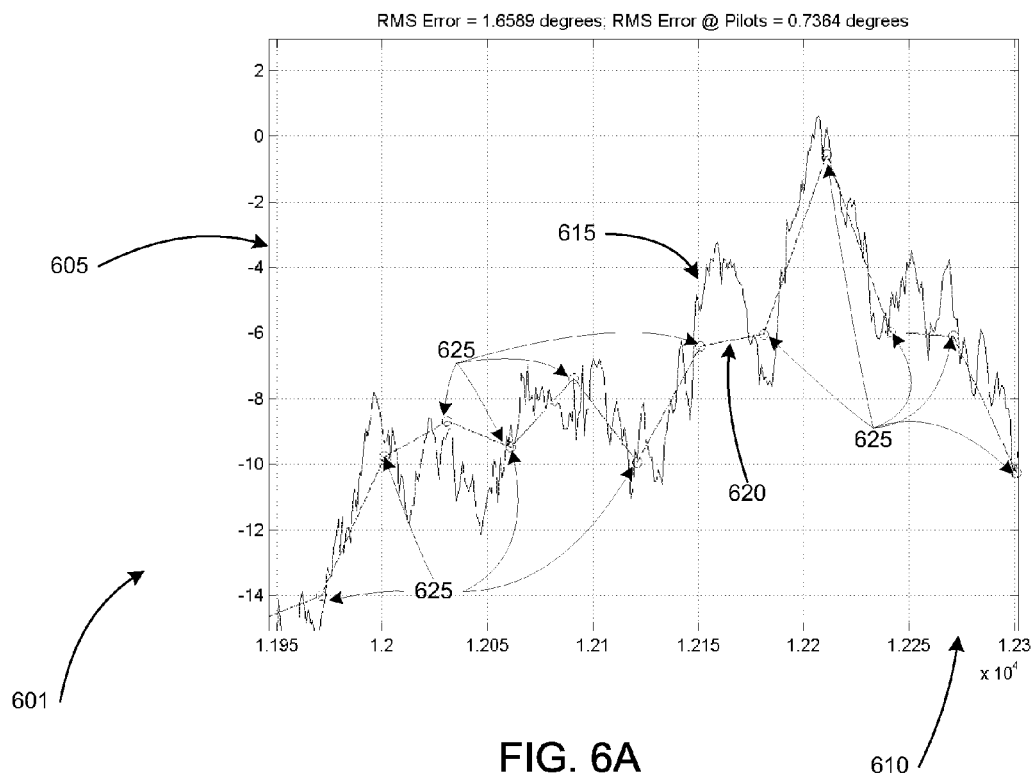
FIG. 6A is a simplified graph of a simulated carrier phase trajectory and a prior art carrier phase trajectory estimation produced by linear interpolation.

Reference is now made to FIG. 6A, which is a simplified graph 601 of a simulated carrier phase trajectory 615 and a prior art carrier phase trajectory estimation 620 produced by linear interpolation.

FIG. 6A includes a y-axis 605 phase in degrees, and an x-axis 610 indicating a running index of symbols.

FIG. 6A demonstrates tracking a phase trajectory according to a prior art linear interpolation. The piece-wise linear carrier phase trajectory estimation 620 is the prior art estimated phase trajectory, and circles 625 denote estimated phases at pilot symbols.

Figure 6B:
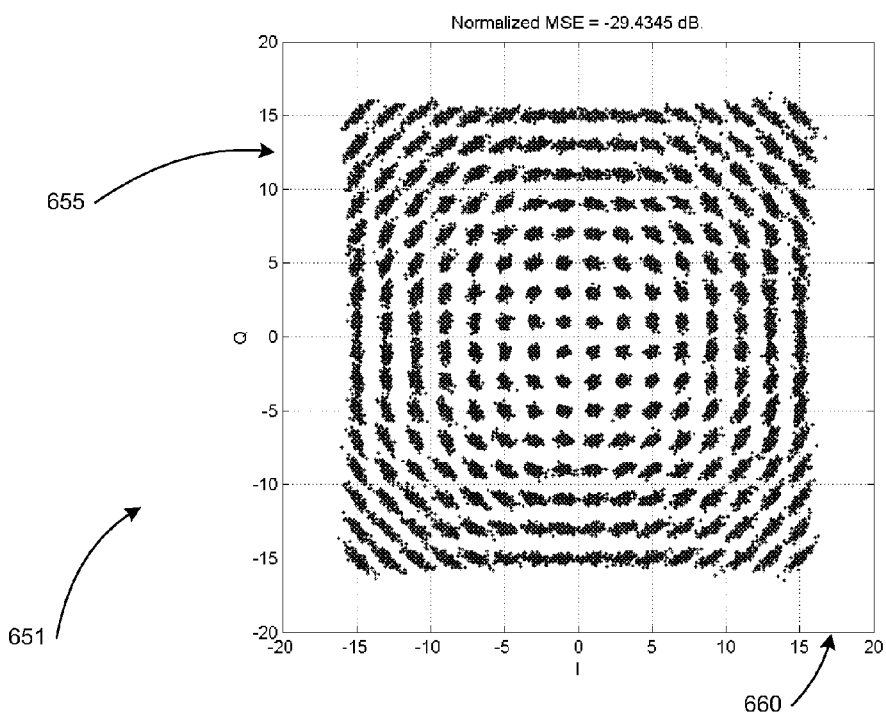
FIG. 6B is a simplified graph of simulated received symbols constellation corresponding to the simulation of FIG. 6A.

Reference is now made to FIG. 6B, which is a simplified graph 651 of simulated received symbols constellation corresponding to the simulation of FIG. 6A.

FIG. 6B includes an x-axis corresponding to an I part of the received symbols, and a y-axis corresponding to a Q part of the received symbols (see Equation 1.1 above). The simulation included many symbols, with added simulated noise, and the graph 651 of FIG. 6B depicts "clouds" of symbols, the "clouds" produced by the residual phase noise moving a simulated received symbol from its noiseless location to a nearby location.

The output SNR is 29.4 dB. If the carrier phase had been perfectly tracked an output SNR of 35 dB is expected.

Figure 7A:
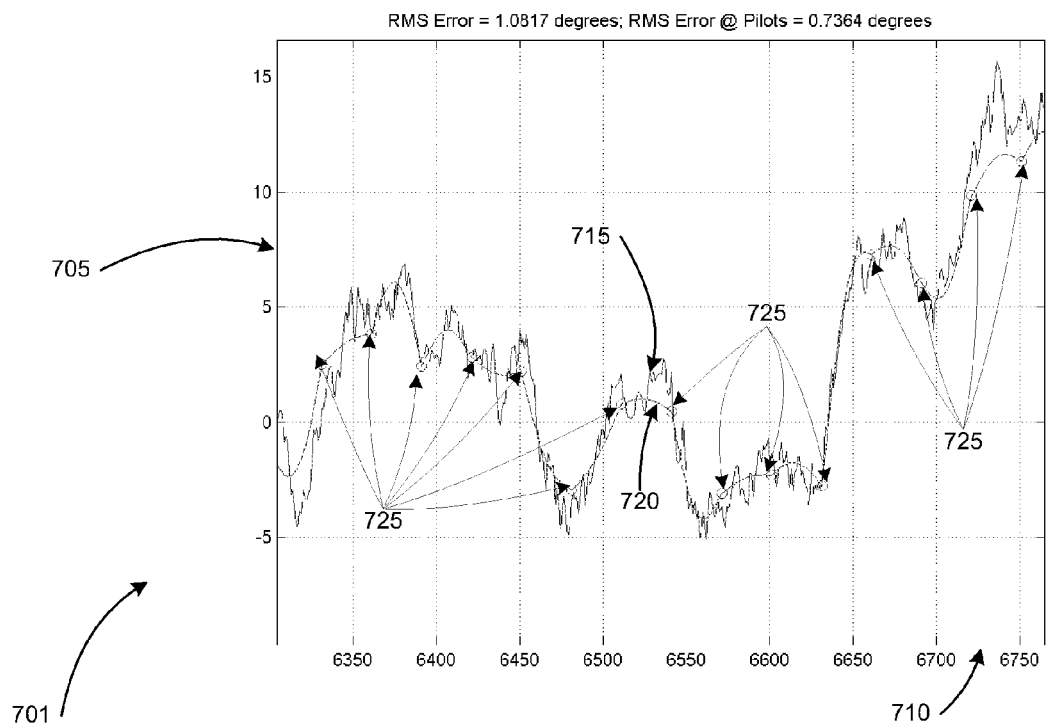
FIG. 7A is a simplified graph of a simulated carrier phase trajectory and a carrier phase trajectory estimation produced using a single DST coefficient according to an example embodiment of the present invention.

Reference is now made to FIG. 7A, which is a simplified graph 701 of a simulated carrier phase trajectory 715 and a carrier phase trajectory estimation 720 produced using a single DST coefficient according to an example embodiment of the present invention.

FIG. 7A includes a y-axis 705 of time, in degrees, and an x-axis 710 indicating a running index of symbols FIG. 7A demonstrates the carrier phase trajectory estimation 720 produced using a single DST coefficient, and circles 725 denote estimated phases at pilot symbols.

Figure 7B:
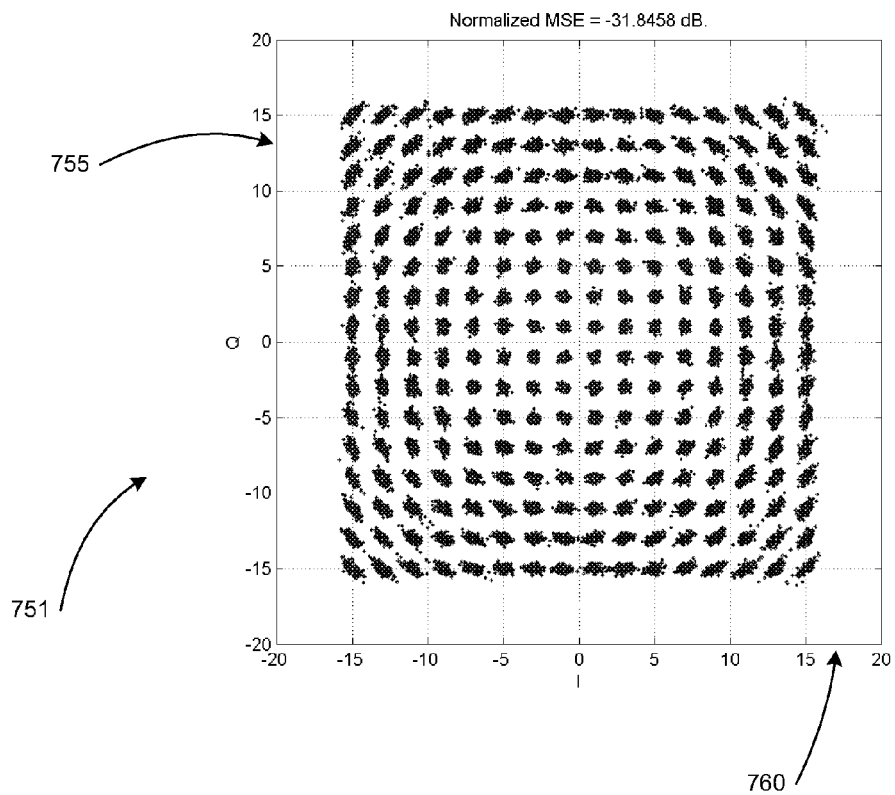
FIG. 7B is a simplified graph of simulated received symbols constellation corresponding to the simulation of FIG. 7A.

Reference is now made to FIG. 7B, which is a simplified graph 751 of simulated received symbols constellation corresponding to the simulation of FIG. 7A.

FIG. 7B includes an x-axis corresponding to the I part of the received symbols, and a y-axis corresponding to the Q part of the received symbols (see Equation 1.1 above). The simulation included many symbols, with added simulated noise, and the graph 751 of FIG. 7B depicts "clouds" of symbols, the "clouds" produced by the residual phase noise moving a simulated received symbol from its noiseless location to a nearby location.

The output SNR is 31.8 dB which is 2.4 dB better than the prior art SNR value of 29.4 depicted in FIG. 6B.

Figure 8A:
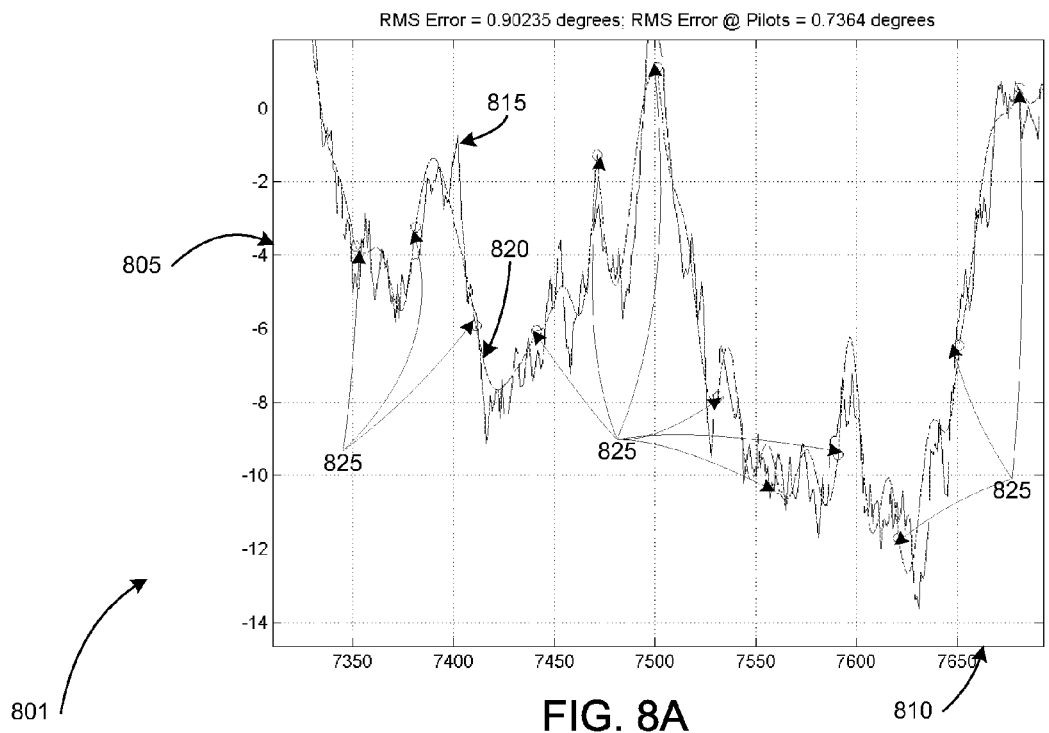
FIG. 8A is a simplified graph of a simulated carrier phase trajectory and a carrier phase trajectory estimation produced using curves associated with first two DST coefficients according to an example embodiment of the present invention.

Reference is now made to FIG. 8A, which is a simplified graph 801 of a simulated carrier phase trajectory 815 and a carrier phase trajectory estimation 820 produced using curves associated with first two DST coefficients according to an example embodiment of the present invention.

FIG. 8A includes a y-axis 805 of phase in units of degrees, and an x-axis 810 indicating a running index of symbols.

FIG. 8A demonstrates the carrier phase trajectory estimation 820 produced using a linear combination of two DST coefficients, and circles 825 denote estimated phases at pilot symbols.

Figure 8B:
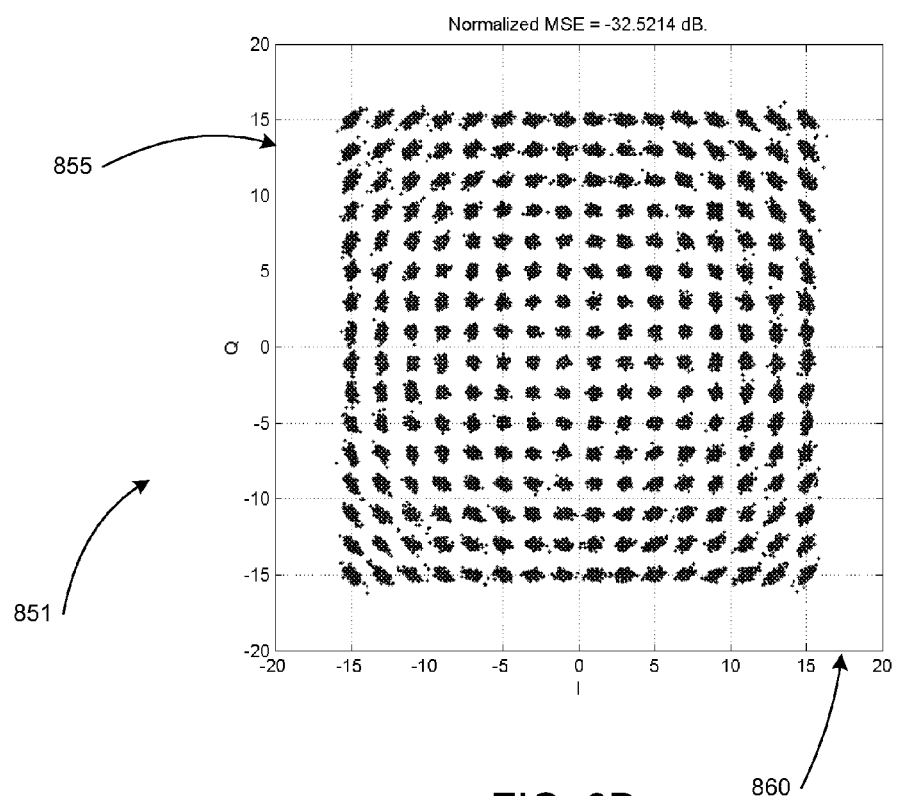
FIG. 8B is a simplified graph of simulated received symbols constellation corresponding to the simulation of FIG. 8A.

Reference is now made to FIG. 8B, which is a simplified graph 851 of simulated received symbols constellation corresponding to the simulation of FIG. 8A.

FIG. 8B includes an x-axis corresponding to the I part of the received symbols, and a y-axis corresponding to the Q part of the received symbols (see Equation 1.1 above). The simulation included many symbols, with added simulated noise, and the graph 851 of FIG. 8B depicts "clouds" of symbols, the "clouds" produced by the residual phase noise moving a simulated received symbol from its noiseless location to a nearby location.

The output SNR is 32.5 dB which is 3.1 dB better than the prior art SNR value of 29.4 depicted in FIG. 6B.

Figure 9A:
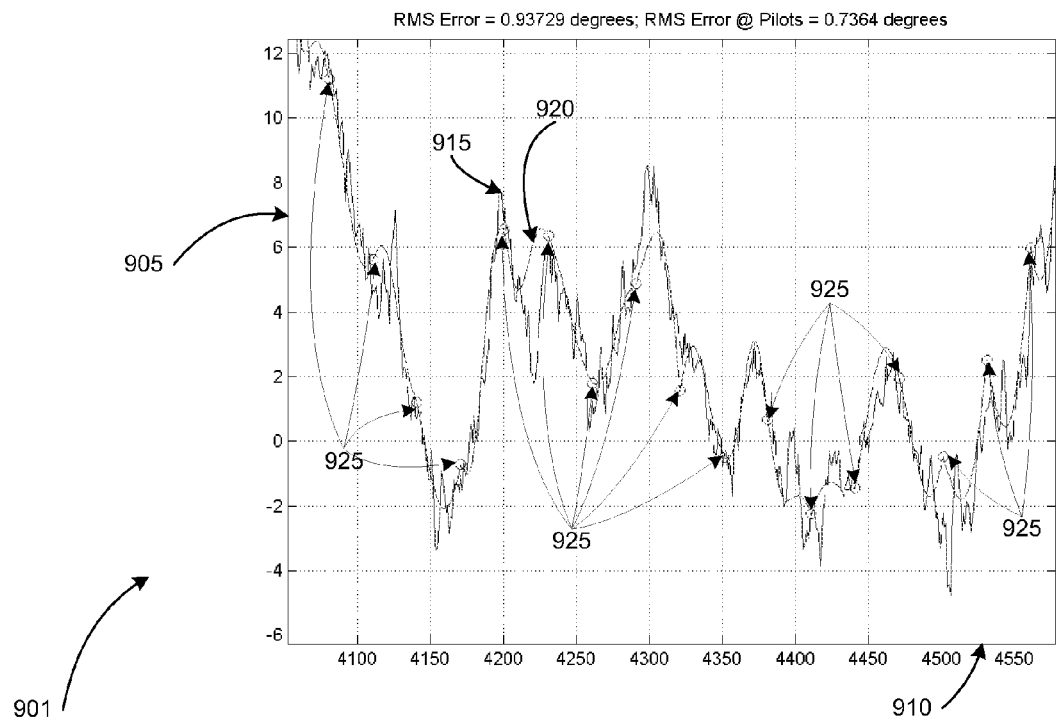
FIG. 9A is a simplified graph of a simulated carrier phase trajectory and a carrier phase trajectory estimation produced using three DST coefficients according to an example embodiment of the present invention.

Reference is now made to FIG. 9A, which is a simplified graph 901 of a simulated carrier phase trajectory 915 and a carrier phase trajectory estimation 920 produced using three DST coefficients according to an example embodiment of the present invention.

FIG. 9A includes a y-axis 905 in degrees, and an x-axis 910 indicating a running index of symbols.

FIG. 9A demonstrates the carrier phase trajectory estimation 920 produced using a linear combination of three DST coefficients, and circles 925 denote estimated phases at pilot symbols.

Figure 9B:
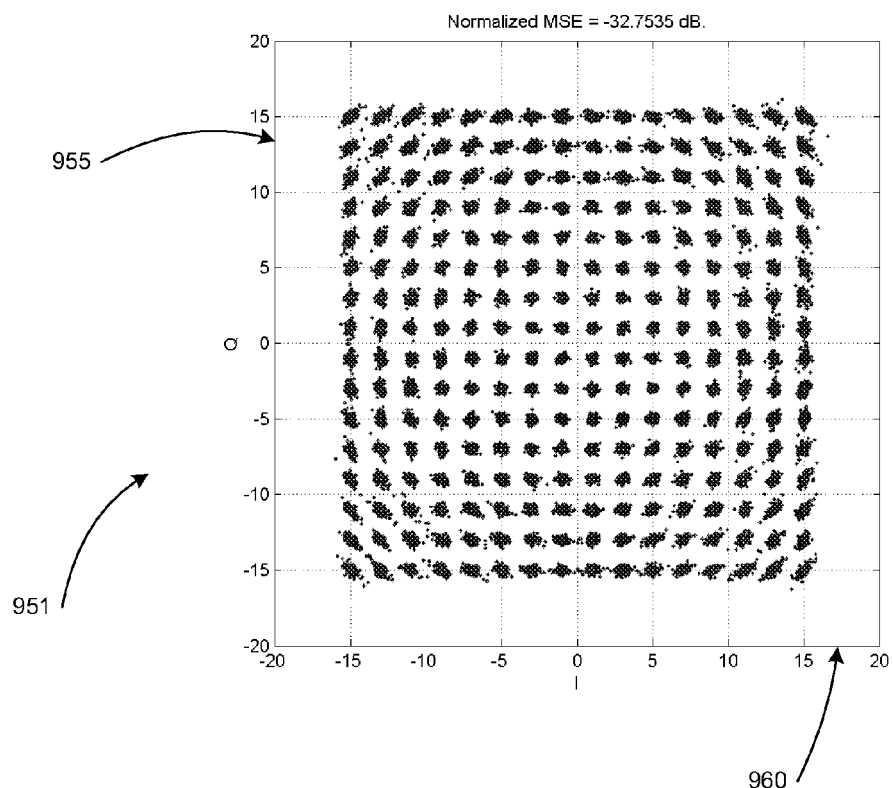
FIG. 9B is a simplified graph of simulated received symbols constellation corresponding to the simulation of FIG. 9A.

Reference is now made to FIG. 9B, which is a simplified graph 951 of simulated received symbols constellation corresponding to the simulation of FIG. 9A.

FIG. 9B includes an x-axis corresponding to the I part of the received symbols, and a y-axis corresponding to the Q part of the received symbols (see Equation 1.1 above). The simulation included many symbols, with added simulated noise, and the graph 951 of FIG. 9B depicts "clouds" of symbols, the "clouds" produced by the residual phase noise moving a simulated received symbol from its noiseless location to a nearby location.

The output SNR is 32.7 dB which is 3.3 dB better than the prior art SNR value of 29.4 depicted in FIG. 6B.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method for a receiver to estimate phase of a carrier wave, comprising:
   receiving a carrier wave carrying pilot symbols and data symbols extending between the pilot symbols;
   demodulating received pilot symbols, producing demodulated pilot symbols;
   determining phase of the carrier wave at received pilot symbols based on a phase of the demodulated pilot symbols;
   demodulating received data symbols, producing demodulated data symbols; and
   interpolating the phase of the carrier wave at points between pilot symbols based, at least in part, on a phase of the demodulated data symbols,
   wherein:
   (a) the interpolating comprises computing a phase trajectory function:
      to approximately fit the phase trajectory function to the determined phase at the received pilot symbols; and
      to approximately fit the estimated phases at the demodulated data symbols; and
   (b) the computing the phase trajectory function further includes computing more than one phase trajectory function, and computing a linear combination of at least some of the more than one phase trajectory functions.

2. The method of claim 1 in which the phase trajectory function is a linear function, and the phase trajectory function does not pass through a phase of at least one of the pilot symbols.

3. The method of claim 1 in which the interpolating is performed based, at least in part, on an estimated phase of some of the demodulated data symbols between pilot symbols, wherein others of the demodulated data symbols are discarded and do not participate in the interpolation.

4. The method of claim 1 in which the interpolating is performed in an iterative fashion, repeating:
   estimating phase of the carrier wave at demodulated data symbols between pilot symbols; and
   estimating a phase trajectory of the carrier wave based on the estimated phase of the demodulated data symbols and on the determined phase of the carrier wave at the received pilot symbols,
   until a stopping criterion is reached.

5. The method of claim 1 in which at least some of the phase trajectory functions comprise trigonometric functions.

6. The method of claim 5 in which the linear combination of trigonometric functions comprises a sum of Fourier coefficients multiplying the trigonometric functions.

7. The method of claim 6 and further comprising:
   estimating spectral density of phase noise; and
   selecting the Fourier coefficients corresponding to spectral frequencies found to be dominant in the spectral distribution of the phase noise.

8. The method of claim 1 and further including selecting one of the phase trajectory functions based, at least in part, on an optimization criterion.

9. The method according to claim 8, in which the selecting is made according to a combination of more than one optimization criteria.

10. The method of claim 1 in which the interpolating is based, at least in part, on demodulated data symbols in a data symbol window comprising data symbols between two adjacent pilot symbols.

11. The method of claim 1 in which the interpolating is based, at least in part, on demodulated data symbols in a data symbol window comprising data symbols between more than two adjacent pilot symbols.

12. The method of claim 1 in which the receiver is a receiver for QAM modulations.

13. A receiver using the method of claim 1.

14. A communication system using the method of claim 1.

15. A non-transitory computer-readable storage medium containing a set of instructions for a general purpose computer to implement the method of claim 1.

16. Apparatus for estimating phase of a carrier wave, comprising:
   a unit for receiving a carrier wave carrying pilot symbols and data symbols extending between the pilot symbols;
   a unit for demodulating received pilot and data symbols, producing demodulated pilot symbols and demodulated data symbols;
   a unit for determining phase of the carrier wave at received pilot symbols based on a phase of the demodulated pilot symbols; and
   a unit for interpolating the phase of the carrier wave at points between pilot symbols based, at least in part, on an estimated phase of demodulated data symbols,
wherein:
(a) the unit for interpolating comprises computing a phase trajectory function:
   to approximately fit the phase trajectory function to the determined phase at the received pilot symbols; and
   to approximately fit the estimated phases at the demodulated data symbols, and
(b) the computing further includes computing more than one phase trajectory function, and computing a linear combination of at least some of the more than one phase trajectory functions.

* * * * *